United States Patent
Wakashiro et al.

(10) Patent No.: US 7,610,124 B2
(45) Date of Patent: Oct. 27, 2009

(54) CONTROL DEVICE FOR MOTOR-DRIVEN VEHICLE

(75) Inventors: Teruo Wakashiro, Sakura (JP); Atsushi Shibutani, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 11/603,062

(22) Filed: Nov. 22, 2006

(65) Prior Publication Data

US 2007/0118255 A1    May 24, 2007

(30) Foreign Application Priority Data

Nov. 24, 2005    (JP)    ............................. 2005-338467

(51) Int. Cl.
| | |
|---|---|
| B60L 9/00 | (2006.01) |
| B60L 11/00 | (2006.01) |
| H02J 7/00 | (2006.01) |
| H02J 7/04 | (2006.01) |
| H02J 7/16 | (2006.01) |
| E03B 11/00 | (2006.01) |
| F17D 1/00 | (2006.01) |

(52) U.S. Cl. .................... 701/22; 320/132; 320/149; 320/130; 320/120; 320/134; 320/136; 318/139; 137/260; 903/917; 903/927

(58) Field of Classification Search .............. 320/146, 320/149
See application file for complete search history.

(56) References Cited

U.S. PATENT DOCUMENTS 6,104,166 A * 8/2000 Kikuchi et al. .............. 320/132

| | | | |
|---|---|---|---|
| 2001/0035742 A1* | 11/2001 | Ito et al. | 320/157 |
| 2002/0070710 A1* | 6/2002 | Yagi et al. | 320/150 |
| 2006/0091857 A1* | 5/2006 | Nakanishi et al. | 320/116 |

FOREIGN PATENT DOCUMENTS

| JP | 10-104325 A | | 4/1998 |
|---|---|---|---|
| JP | 10-108380 A | | 4/1998 |
| JP | 10-174297 A | | 6/1998 |
| JP | 10174297 A | * | 6/1998 |
| JP | 2000-030753 A | | 1/2000 |
| JP | 2000-175306 A | | 6/2000 |
| JP | 2001-314040 A | | 11/2001 |
| JP | 2003-125502 A | | 4/2003 |
| JP | 2004-236381 A | | 8/2004 |
| JP | 2004236381 A | * | 8/2004 |

* cited by examiner

Primary Examiner—Thomas G Black
Assistant Examiner—Sze-Hon Kong
(74) Attorney, Agent, or Firm—Arent Fox LLP

(57) ABSTRACT

A control device for a motor-driven vehicle, the control device includes: a zone determining unit that determines at least a normal use zone, a discharge zone, an over-discharge zone, a charge zone, and an over-charge zone; and a control unit controlling the motor by stipulating the charge and discharge power of the storage unit for each zone that is determined by the zone determining unit, setting the normal use zone to be in a predetermined range that includes a remaining capacity at which the discharge output according to the remaining capacity of the storage unit and the charge input according to the remaining capacity of the storage unit are equivalent, and making the discharge output and the charge input in the normal use zone to be a predetermined value regardless of the remaining capacity of the storage unit in the zone.

5 Claims, 15 Drawing Sheets

CONTROL DEVICE FOR MOTOR-DRIVEN VEHICLE

BACKGROUND OF THE INVENTION

1. Field of the Invention

The present invention relates to a control device for a motor-driven vehicle such as a hybrid vehicle, an electric vehicle, and a fuel cell vehicle.

Priority is claimed on Japanese Patent Application No. 2005-338467, filed Nov. 24, 2005, the content of which is incorporated herein by reference.

2. Description of Related Art

In a control device for a motor-driven vehicle such as a hybrid vehicle, a storage unit such as a battery is mounted as a drive unit of a motor for producing an assistance driving force to assist an engine or as a unit of recovering regenerative energy that is produced by regeneration by the motor. Since it is necessary to consider the remaining capacity of the storage unit when using it to drive the motor or using the motor as an electrical generator, a zone determining unit is provided that determines whether the remaining capacity of the storage unit is within a normal use zone, an over-discharge zone, or an over-charge zone. The control of the motor is then altered in accordance with the zone that the storage unit is determined to be in by this zone determining unit (for example, refer to Japanese Unexamined Patent Application, First Publication No. 2000-175306).

The aforementioned prior art can be applied in the case of using a storage unit in which changes in the input/output upper limit are comparatively small with respect to the remaining capacity of the battery, as in a nickel-metal hydride (Ni-MH) battery serving as the storage unit. However, when applied to a storage unit in which changes in the input/output upper limit are comparatively large with respect to the remaining capacity, as in a lithium-ion (Li-ion) battery, it is difficult to ensure that the charging and discharging of electrical energy is in balance. That is, even when used near the same remaining capacity, the usage balance of the storage unit differs when producing an assistance driving force and when recovering regenerative energy. As a result, control of the energy balance becomes difficult.

Also, particularly with a Li-ion battery, performance issues arise when the storage unit is left as it is over an extended period of time at a high temperature and with the remaining capacity on the overcharge side. Thus, management also becomes necessary in view of the case of simply leaving the battery as it is.

The present invention therefore has as its object to provide a control device for a motor-driven vehicle that can readily perform energy management even for a storage unit in which the changes in the input/output upper limit are comparatively large with respect to the remaining capacity, as is the case with a Li-ion battery.

SUMMARY OF THE INVENTION

The present invention is a control device for a motor-driven vehicle, the motor-driven vehicle includes a motor and an electrical generator serving as power sources of the vehicle; and a storage unit that stores electrical energy generated by an output of the electrical generator and regenerative energy that is obtained by regenerative operation of the motor when the vehicle decelerates and has characteristic of the discharge output increasing as a remaining capacity of the storage unit increases, and a charge input decreasing as the remaining capacity increases, the control device includes a zone determining unit that determines at least a normal use zone, a discharge zone in which the remaining capacity is less than the normal use zone, an over-discharge zone in which the remaining capacity is still less than the discharge zone and discharge control is prohibited, a charge zone in which the remaining capacity is greater than the normal use zone, and an over-charge zone in which the remaining capacity is still greater than the charge zone and charge control is prohibited; and a control unit controlling the motor by stipulating the charge and discharge power of the storage unit for each zone that is determined by the zone determining unit, setting the normal use zone to be in a predetermined range that includes a remaining capacity at which the discharge output according to the remaining capacity of the storage unit and the charge input according to the remaining capacity of the storage unit are equivalent, and making the discharge output and the charge input in the normal use zone to be a predetermined value regardless of the remaining capacity of the storage unit in the zone.

Since the normal use zone is set in a predetermined range that includes a remaining capacity at which the discharge output according to the remaining capacity and the charge input according to the remaining capacity are equivalent, the discharge output and the charge input in the normal use zone can be set near the upper-limit value, and it is possible to use both as approximately equivalent values. Therefore, while ensuring the discharge output and the charge input are as large as possible, it is possible to readily ensure the balance of the discharge output and the charge input and possible to simultaneously achieve an increase in energy and fuel efficiency.

Also, when the temperature of the storage unit is higher than a predetermined temperature, the remaining capacity value that stops charging in the charge zone may be changed to the low capacity side.

This constitution enables charging to be stopped in the state of the remaining capacity of the storage unit being restricted to some extent. Therefore, even when the storage unit is left as it is over an extended period under a high temperature, it is possible to reliably prevent performance changes that arise when the battery is thus left as it is over an extended period by holding the remaining capacity to a low capacity so that performance changes do not occur.

Also, when the temperature of the storage unit is lower than a predetermined temperature, the range of the normal use zone may be narrowed.

This constitution enables the temperature of the storage unit to be increased with discharge energy when performing control so that the storage unit, when in the charge zone, returns to the normal use zone by relatively increasing the charge zone that is set to the upper side of the normal use zone. Also, this constitution enables the temperature of the storage unit to be increased with charge energy when performing control so that the storage unit, when in the discharge zone, returns to the normal use zone by relatively increasing the discharge zone that is set to the lower side of the normal use zone. For this reason, it is possible to quickly warm the storage unit.

Moreover, when the temperature of the storage unit is lower than a predetermined temperature, the remaining capacity value that stops the discharging in the discharge zone may be changed to the high capacity side.

This constitution enables stopping discharging in the state of having ensured the remaining capacity of the storage unit to some extent. Therefore, there is the effect of being able to ensure a minimum output of the storage unit even during use under low temperatures where it is difficult to ensure output.

Moreover, the storage unit may be a lithium-ion battery.

This constitution can make use of the characteristics of lithium-ion batteries, and so there is the effect of being able to effectively use a lithium-ion battery.

DETAILED DESCRIPTION OF THE INVENTION

An embodiment of the present invention shall be described below with reference to the appended drawings.

Figure 1:
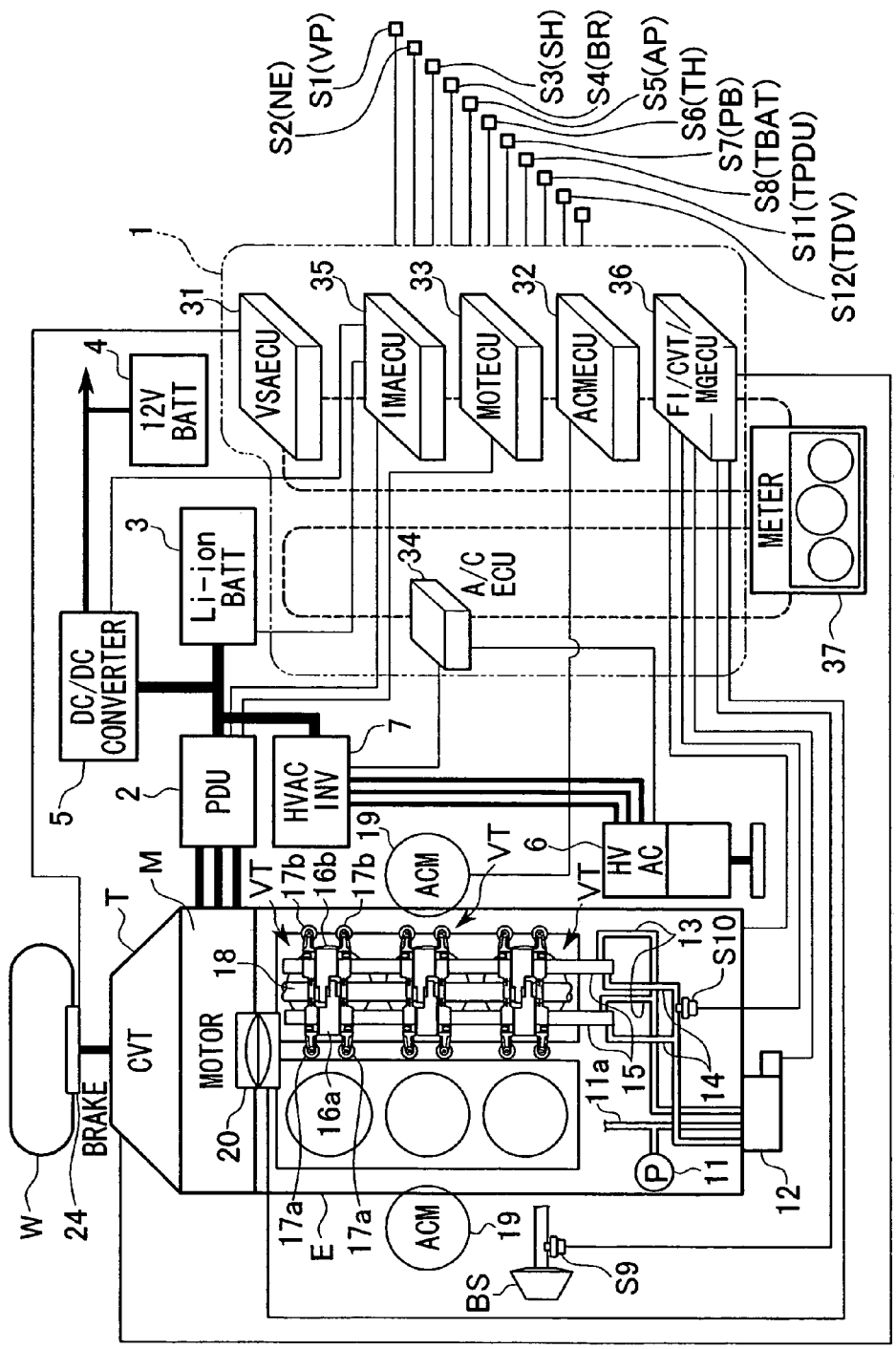
FIG. 1 is a block diagram of the control device for a hybrid vehicle in the embodiment of the present invention.

FIG. 1 shows a hybrid vehicle as one example of a motor-driven vehicle according to the embodiment of the present invention. The vehicle has a structure in which an internal-combustion engine (electricity generating device) E serving as a power source of the vehicle, an electric motor M serving as a power source, and a transmission T are coupled in series.

The driving force from both the engine (internal-combustion engine) E and the motor M are transmitted to left and right drive wheels W and W (front or rear) of the vehicle via a differential (not shown) that distributes the driving forces from the transmission T such as a continuously variable transmission (CVT) or a manual transmission (MT) to the drive wheels W and W. Furthermore, when a driving force is transmitted from the drive wheels W side to the motor M side during deceleration of the hybrid vehicle, the motor M functions as a generator to produce so-called regenerative braking force, so that the kinetic energy of the vehicle is recovered as electrical energy. In addition, depending on the drive state of the vehicle, the motor M is driven as a generator by the output of the engine E to produce electrical energy.

For example, a three-phase brushless direct current motor is used as the motor M, which is connected to a power drive unit (PDU) 2. A high-voltage Li-ion battery 3 for sending and receiving electrical energy from the motor M is connected to the PDU 2. The battery (storage unit) 3 is for example constructed from individual modules connected in series, with each module includes a plurality of cells connected in series.

The driving and regenerative operations of the motor M are performed by the PDU 2, which receives a control command signal from a control unit 1. That is, during the driving of the motor M, the PDU 2, based on a torque command that is output from the control unit 1, converts direct-current power that is output from the battery 3 to three-phase alternating-current power to be supplied to the motor M. Meanwhile, during the regenerative operation of the motor M, the three-phase alternating-current power that is output from the motor M is converted to direct-current power that is charged to the battery 3.

A 12-V auxiliary battery 4 for driving various accessories is connected in parallel to the PDU 2 and the battery 3 via a downverter 5 includes a DC-DC converter. The downverter 5 is controlled by the control unit 1 and charges the auxiliary battery 4 by lowering the voltage from the PDU 2 or the battery 3.

Moreover, a crankshaft of the internal-combustion engine E is connected, for example through a belt or a clutch, to a rotation shaft of an air conditioning motor (not shown) equipped in a hybrid air conditioning compressor (HVAC) 6. This air conditioning motor is connected to an air conditioning inverter (HVAC INV) 7. The air conditioning inverter 7 is connected in parallel to the PDU 2 and the battery 3, and under the control of the control unit 1, converts the direct-current power output from the PDU 2 and the battery 3 into three-phase alternating-current power to be supplied to the air conditioning motor so as to drive the hybrid air conditioning compressor 6.

Here, the hybrid air conditioning compressor 6 can be driven by either one of the internal-combustion engine E and the motor M.

The engine E is a so-called V-type six-cylinder engine, of a construction having three cylinders on one bank comprising a variable valve timing mechanism VT enabling a cylinder deactivation operation, and a construction having three cylinders on the other bank comprising a normal valve operating mechanism (not shown) that does not perform the cylinder deactivation operation. Furthermore, the three cylinders that enable the cylinder deactivation operation each have a construction such that two inlet valves and two exhaust valves are able to maintain their closed state by means of the variable timing mechanism VT, via an oil pressure pump 11 a spool valve 12, a cylinder deactivation side path 13, and a cylinder deactivation cancellation side path 14.

Thereby, the internal-combustion engine E may be switched between three-cylinder operation (cylinder deactivation operation) in the state such that the three cylinders of the one bank are deactivated, and six-cylinder operation (all-cylinder operation) such that all six cylinders of both banks are driven.

Specifically, if operating oil being supplied from the oil pressure pump 11 through a lubrication system piping 11a to the engine lubrication system is partially supplied via the spool valve 12 comprising a solenoid controlled by the control unit 1, to the cylinder deactivation side path 13 on the bank capable of cylinder deactivation operation, a cam lift rocker arm 16a (16b) and valve drive rocker arms 17a (17b)

which are supported on the respective rocker shafts 15 and integrally driven, are able to be driven separately. Therefore, the driving forces of the cam lift rocker arms 16a and 16b driven by the rotation of the cam shaft 18 are not transmitted to the valve drive rocker arms 17a and 17b, so that the inlet valves and the exhaust valves remain in the closed state. Accordingly the cylinder deactivation operation where the inlet valves and the exhaust valves of three cylinders enter the closed state may be performed.

The internal-combustion engine E is mounted via a damping device (ACM: Active Control Engine Mount) 19 onto the vehicle so that the damping device 19 can suppress the generation of vehicle vibration that occurs in the operating state of the internal-combustion engine E, that is, in the state of three-cylinder operation (cylinder deactivation operation).

Moreover, this internal-combustion engine E comprises an electronic throttle control system (ETCS) 20 which electronically controls a throttle valve (not shown).

The ETCS 20 drives an ETCS driver according to the throttle opening calculated in the control unit 1 based for example on the accelerator pedal opening AP according to the operation amount of the accelerator pedal (not shown) by a driver, the operating state of the vehicle such as the vehicle traveling speed (vehicle speed) VP or the engine speed NE, and on the torque distribution between the internal-combustion engine E and the motor M, so as to directly control the throttle valve.

A booster BS is linked to the brake pedal (not shown). A master power internal negative pressure sensor S9 which detects the brake master power internal negative pressure is provided in the booster BS.

The driving wheel W comprises a brake device 24. The brake device 24 suppresses the generation of rapid behavioral change of the vehicle by control of the control unit 1. For example, it prevents slipping of the driving wheel W on a slippery road surface or the like, suppresses the occurrence of side slip such as oversteering or understeering, prevents the driving wheel W from being in a locked state during braking, ensures the desired driving force and the steering performance of the vehicle, stabilizes the orientation of the vehicle, and assists with traveling by means of a creep force, for example, preventing reversing on a slope when the internal-combustion engine E is stopped.

Inputs to the control unit 1 are for example: a detection signal from a vehicle speed sensor S1 which detects the traveling speed VP of the vehicle, a detection signal from an engine speed sensor S2 which detects the engine speed NE, a detection signal from a shift position sensor S3 which detects the shift position SH of the transmission T, a detection signal from a brake switch S4 which detects the brake pedal operation state BR, and a detection signal from an accelerator pedal opening sensor S5 which detects the accelerator pedal opening AP according to the operation amount of the accelerator pedal.

Moreover, inputs to the control unit 1 are for example; a detection signal from a throttle opening sensor S6 which detects the throttle opening TH, a detection signal from an intake pipe pressure sensor S7 which detects the intake pipe negative pressure PB, a detection signal from a battery temperature sensor S8 which detects the temperature TBAT of the battery 3, a detection signal from a master power internal negative pressure sensor S9, a detection signal from a POIL sensor S10 which detects the oil pressure of the cylinder deactivation cancellation side path 14 during cylinder deactivation, a detection signal from a PDU temperature sensor S11 which detects the temperature TPDU of the PDU 2, and a detection signal from a DV temperature sensor S12 which detects the temperature TDV of the downverter 5.

Moreover, the control unit 1 comprises for example: a VSA (Vehicle Stability Assist) ECU 31 which controls the brake device 24 to stabilize the behavior of the vehicle; an ACMECU 32 which drive controls the damping device 19 to suppress the generation of car body vibration caused by the operating state of the internal-combustion engine E; a MOTECU 33 which controls the driving and the regenerative operation of the motor M; an A/CECU 34 which drive controls the air conditioning hybrid air conditioning compressor 6 and the air conditioning inverter 7; an IMAECU 35 which monitors and protects the high voltage electrical equipment system including for example of the PDU 2, the battery 3, the downverter 5, and the motor M, and controls the operation of the PDU 2 and the downverter 5; and an FI/CVT/MGECU 36. The VSAECU 31, the ACMECU 32, the MOTECU 33, the A/CECU 34, the IMAECU 35, and the FI/CVT/MGECU 36 are connected in a mutually communicable manner. Also, the respective ECUs 31 to 36 are connected to a meter 37 comprising instruments which display the amount of the respective types of states.

The FI/CVT/MGECU 36 controls for example the fuel supply and the ignition timing for the internal-combustion engine E and controls the shifting operation of the transmission T.

Also, based on the torque value that is required in accordance with the accelerator pedal opening, or the torque value targeted during the travel control satisfying predetermined traveling conditions previously set according to the input operation of the driver, that is cruise control, for example, such as the constant speed traveling control in which the speed of the vehicle is controlled to a target speed or during follow travel control for following the preceding vehicle while maintaining a predetermined vehicular gap, the FI/CVT/MGECU 36 sets the power plant (P/P) torque that is the target torque for the torque output from the power plant (that is, the internal-combustion engine E and the motor M) and sets the distribution of the power plant torque (P/P) with respect to the respective torque instructions of the internal-combustion engine E and the motor M.

Next, zoning of the remaining capacity of the battery 3 shall be described. Calculation of the remaining capacity of the battery 3 is performed by the IMAECU 35, being calculated from the voltage, charging/discharging current, and temperature and the like.

The battery 3 in the present embodiment is a Li-ion battery. A Li-ion battery couples an anode made of a lithium metal or a lithium-carbon compound and a cathode made of manganese dioxide or cobalt oxide via a separator, and performs charging and discharging by an organic electrolyte that transports lithium ions between the anode and cathode. Although dependency on the remaining capacity is high in a Li-ion battery, it generates at least twice the power of a Ni-MH battery. Also, a Li-ion battery has excellent durability by having half the resistance change of a Ni-MH battery, and under identical conditions its charge-and-discharge durability is approximately twice that of a Ni-MH battery.

Figure 2:
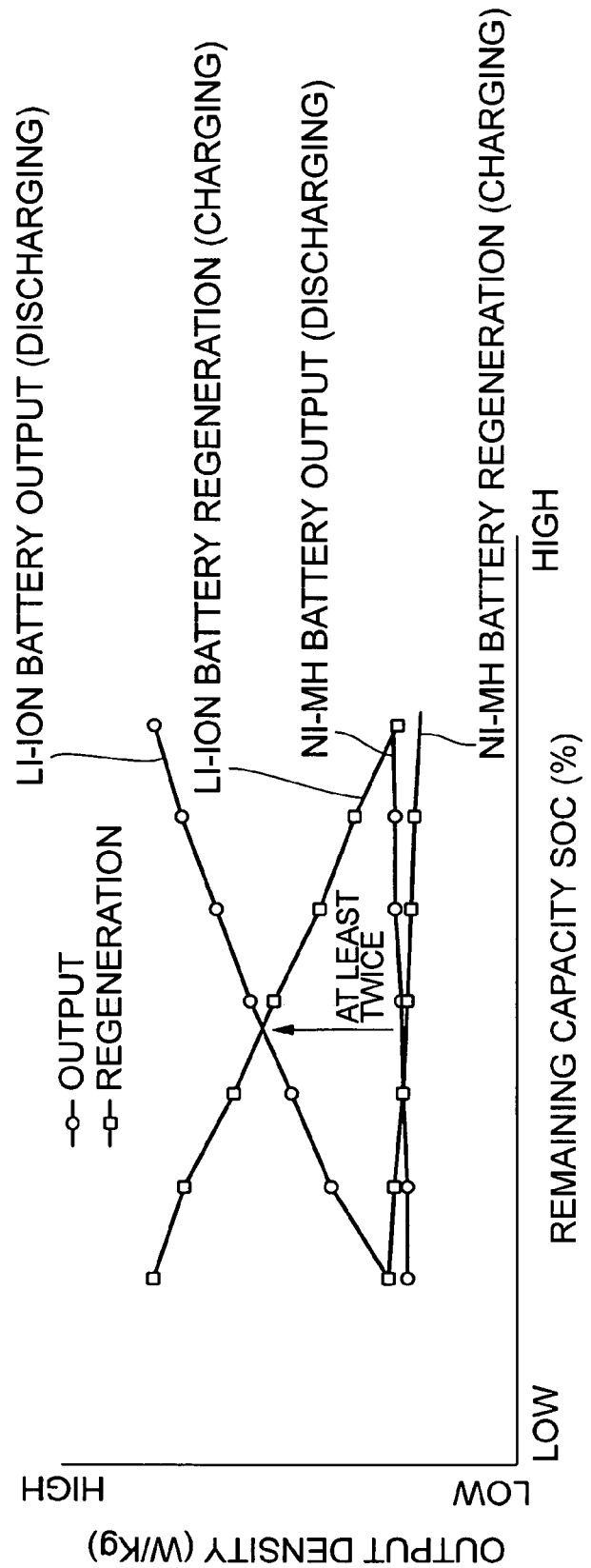
FIG. 2 is a graph that shows the relationship between the output density and remaining capacity of a Li-ion battery and a Ni-MH battery.

Specifically, as shown in FIG. 2, when the output density (W/kg) is placed on the vertical axis and the remaining capacity, also referred to as the state of charge (SOC) (%), on the horizontal axis, a Ni-MH battery has a charge output density and a discharge output density that are approximately constant without being effected by the remaining capacity. By contrast, in a Li-ion battery, during discharge, the discharge power tends to increase the higher the remaining capacity is, and during charging the charge power tends to decrease the higher the remaining capacity is. Since the charge power and the discharge power increase and decrease in such a tendency, comparing the intersecting remaining capacities during charging and discharging of an Li-ion battery and a Ni-MH battery, the former has a output density approximately twice that of the latter.

However, when a Li-ion battery is left as it is over a prolonged period under a high temperature with a remaining capacity of a certain level or more, dissolution of the organic electrolyte due to the potential occurs, and complex compounds accumulate on the cathode surface, inducing a property change.

Accordingly, zoning of the remaining capacity is necessary in view of the change in performance when a Li-ion battery is thus left as it is.

The zoning of the battery's remaining charge is as follows. A zone A serving as a normal use zone is defined as the basis. A zone B1 (discharge zone) that is a provisional use zone is defined on the discharge side of zone A where the remaining capacity is small, and a zone C that is an over-discharge zone where the remaining capacity is still smaller is defined below zone B1. A zone B2 (charge zone) that is a provisional use zone is defined on the charge side of zone A where the remaining capacity is large, and a zone D that is an over-charge zone where the remaining capacity is still larger is defined above zone B2.

When setting the zoning of the remaining capacity, the upper-limit values of the charge and discharge power are set in accordance with the battery temperature, which is the factor having the greatest effect on charging and discharging of a battery, and the widths of the aforementioned zones are set as follows.

Figure 3:
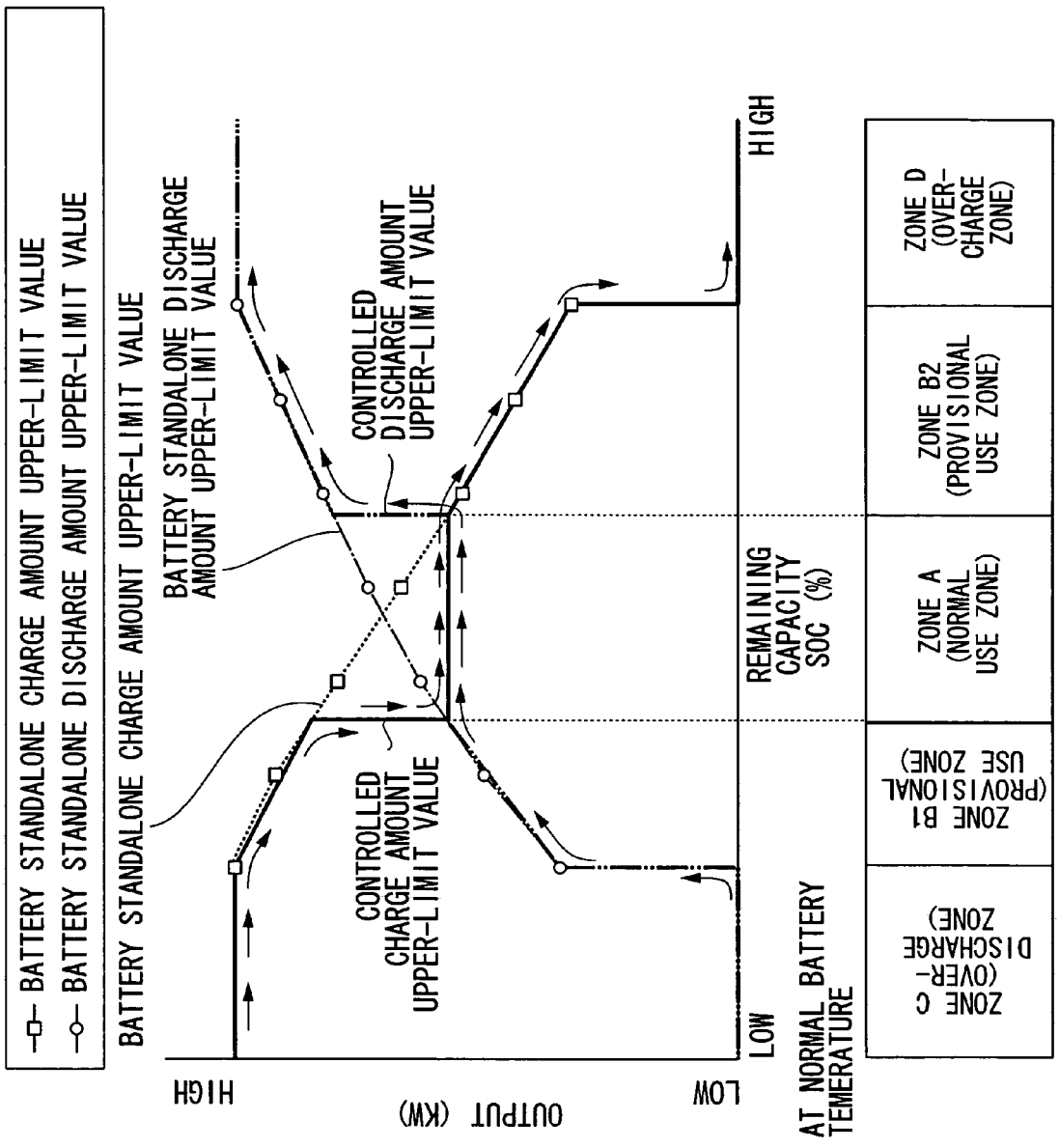
FIG. 3 is a graph that shows the relationship between the output and remaining capacity of a Li-ion battery at a normal temperature.

In FIG. 3, the charge and discharge power of the battery 3 (charge/discharge amount (kW)) at a normal battery temperature (for example, 25 degrees to 40 degrees) is shown on the vertical axis, and the remaining battery capacity SOC (%) on the horizontal axis, with zone divisions included in the graph of the upper-limit values of the charge/discharge amounts of the standalone battery (thin line) and the controlled charge/discharge upper-limit values (thick line). To facilitate understanding, arrows are given to indicate the state of changes in the charge side and the discharge side.

Basically, as shown in FIG. 2, during discharging of the standalone battery, as the remaining capacity increases the upper-limit value of the discharge amount tends to increase, and during charging, as the remaining capacity increases the upper-limit value of the charge amount tends to decrease. However, in the range at which zone A (normal use zone) is defined, the upper-limit values of the controlled charge/discharge amounts are matched and set to a certain value.

In the range of zone B1 (provisional use region on the discharge side) and the range of zone B2 (provisional use region on the charge side), the upper-limit value of the charge/discharge amounts of the standalone battery is set as is as the upper-limit value of the controlled charge/discharge amounts. During discharging, as the remaining capacity increases the upper-limit value of the controlled discharge amount tends to increase, and during charging, as the remaining capacity increases the upper-limit value of the controlled charge amount tends to decrease.

In the range of zone C (over-discharge zone), the upper-limit values of the controlled charge/discharge amounts become certain values. Specifically, the upper limit of the controlled discharge amount becomes zero, while the upper-limit value of the controlled charge amount becomes the maximum value.

In the range of zone D (the over-charge zone), the upper-limit values of the controlled charge/discharge amounts become certain values. Specifically, the upper limit of the controlled charge amount becomes zero, while the upper-limit value of the controlled discharge amount becomes the maximum value.

Figure 4:
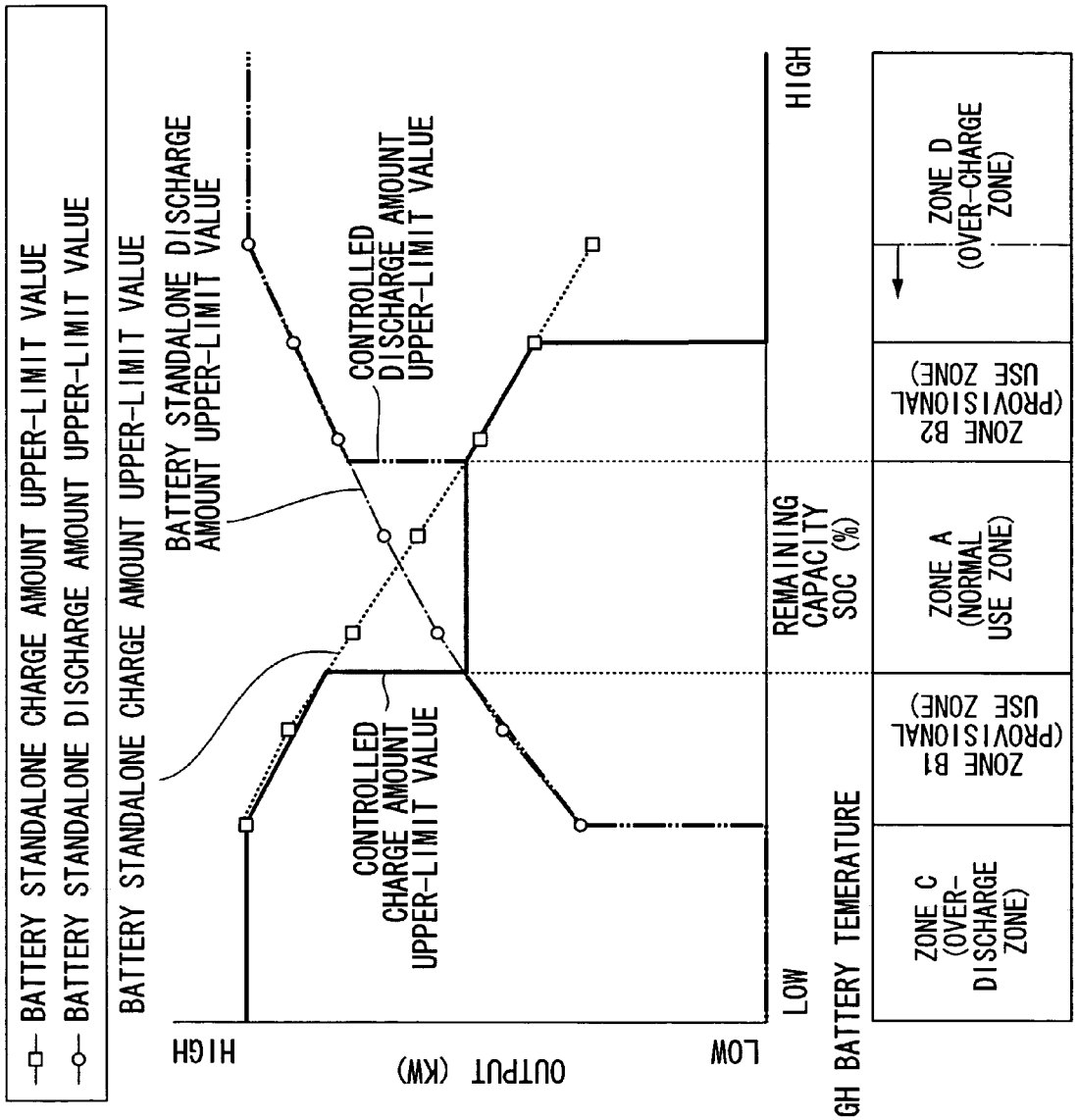
FIG. 4 is a graph that shows the relationship between the output and remaining capacity of a Li-ion battery at a high temperature.

In FIG. 4, the charge and discharge power of the battery 3 (charge/discharge amount (kW)) at a high battery temperature (for example, over 40 degrees) is shown on the vertical axis, and the remaining battery capacity SOC (%) on the horizontal axis, with zone divisions included in the graph of the upper-limit values of the charge/discharge amounts of the standalone battery and the upper-limit values of the controlled charge/discharge amounts.

Basically it is the same as for the case of the battery at a normal temperature shown in FIG. 3, with the point of difference being that the range of zone B2 (the provisional use region on the charge side) is narrowed, or in other words the range of zone D (the over-charge zone) is expanded. The range of remaining capacity in which the upper-limit value of the controlled charge amount is zero is expanded by changing the dotted line position showing the conventional boundary to the low remaining capacity side. In the state of the remaining battery capacity SOC being high, charging is thus prohibited in view of performance changes when the battery is left as it is at a high temperature and with a high remaining capacity. Since there are otherwise no differences from the normal temperature state of the battery already described, further description shall be omitted.

Figure 5:
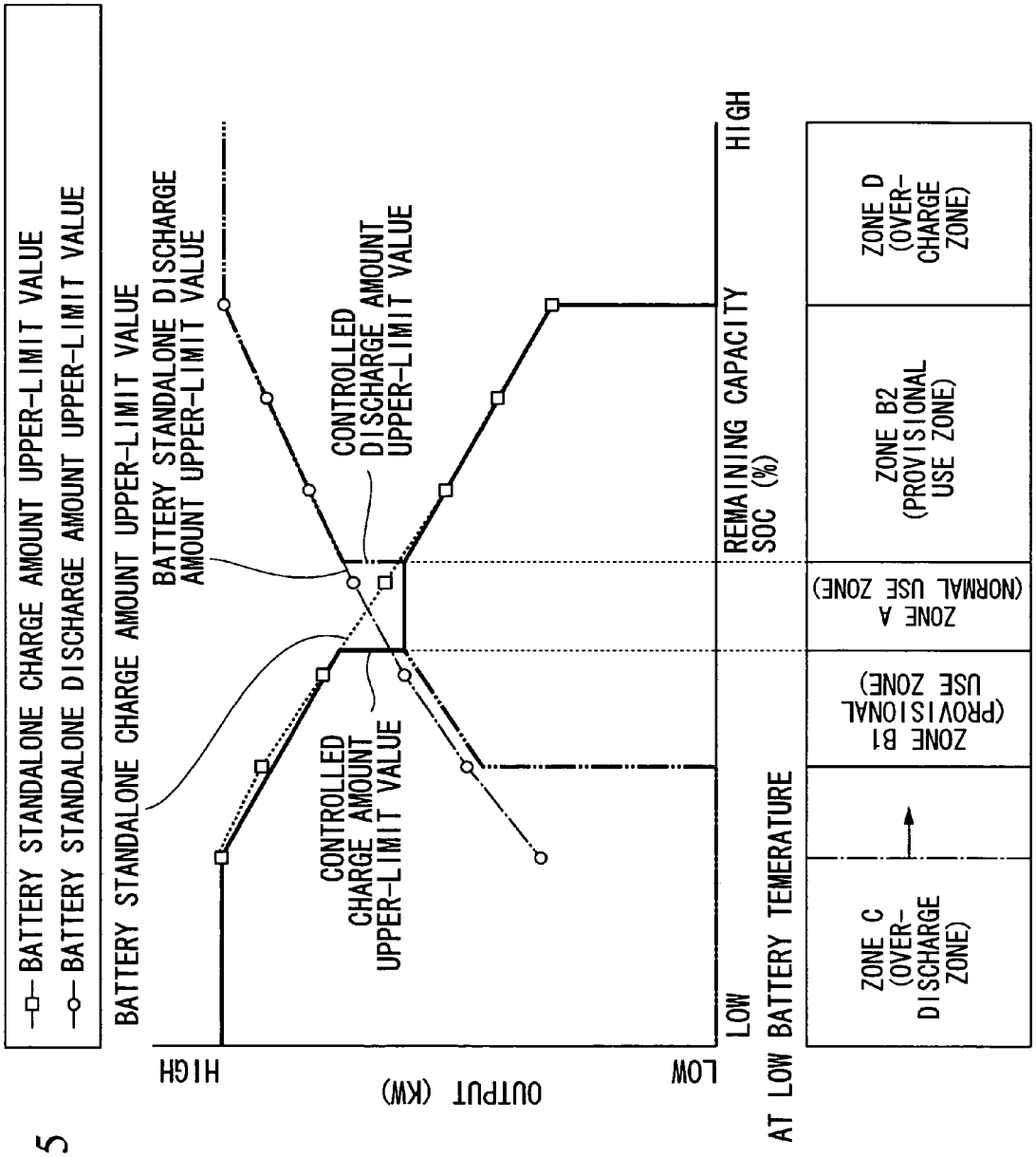
FIG. 5 is a graph that shows the relationship between the output and remaining capacity of a Li-ion battery at a low temperature.

In FIG. 5, the charge and discharge power of the battery 3 (charge/discharge amount (kW)) at a low battery temperature (for example, 0 degrees or less) is shown on the vertical axis, and the remaining battery capacity SOC (%) on the horizontal axis, with zone divisions included in the graph of the upper-limit values of the charge/discharge amounts of the standalone battery and the upper-limit values of the controlled charge/discharge amounts.

When the battery is at a low temperature, the region of zone A is narrowed compared to during the normal temperature of the battery, and the range of remaining capacity in which the upper-limit value of the controlled discharge amount is zero is expanded by changing the dotted line position showing the conventional boundary to the high remaining capacity side.

Specifically, together with reducing the range that is set as zone A (normal use region), the upper-limit values of the controlled charge/discharge amounts are matched at a certain value. Accordingly, in the normal use region of zone A during a low temperature of the battery, the upper-limit values of the controlled charge/discharge amounts are higher than during a normal temperature, and so the rise in temperature of the battery 3 is accelerated by heat generation during charging and discharging.

When determining whether or not the battery 3 is in zone A, which is the normal use region, zone B1, which is the provisional use region on the discharge side, zone C, which is the over-discharge zone, zone B2, which is the provisional use region on the charge side, or zone D, which is the over-charge zone, the remaining capacity of the battery is specified by an integrated value of the electrical current or the like. Hysteresis is set at the boundaries between zones so no hunting occurs.

Figure 6:
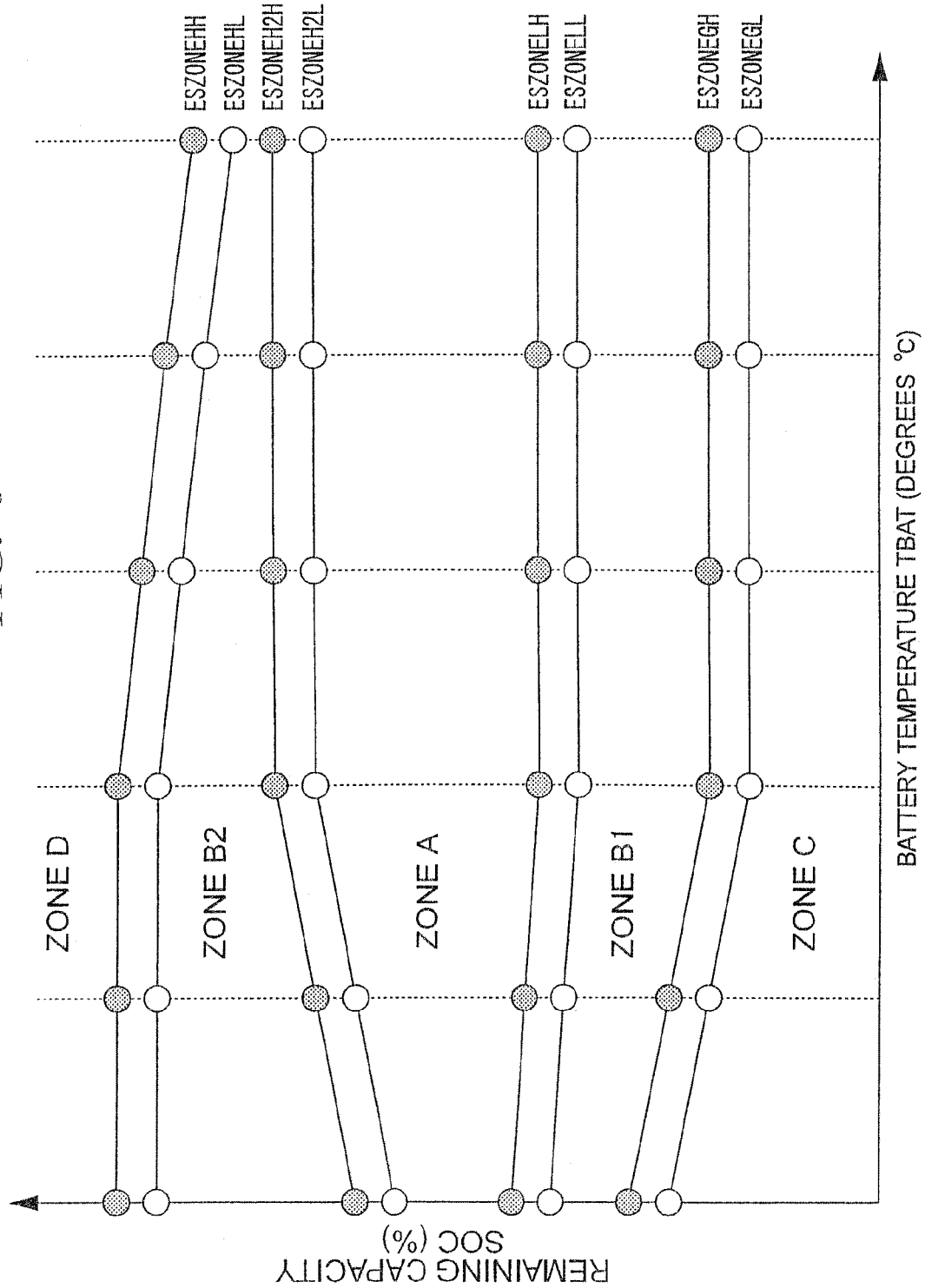
FIG. 6 is a graph that shows zone division of a battery's remaining capacity corresponding to the battery temperature.

Specifically, as shown in FIG. 6 which has the remaining battery capacity SOC (%) on the vertical axis and the battery temperature TBAT (degrees C) on the horizontal axis, the widths of the zones change by the battery temperature TBAT. Hysteresis values of an upper threshold value ESZONEHH and a lower threshold value ESZONEHL are set at a threshold value ESZONEH that is the boundary between zone D and zone B2. Hysteresis values of an upper threshold value ESZONEH2H and a lower threshold value ESZONEH2L are set at a threshold value ESZONEH2 that is the boundary between zone B2 and zone A. Hysteresis values of an upper threshold value ESZONELH and a lower threshold value ESZONELL are set at a threshold value ESZONEL that is the boundary between zone A and zone B1. Hysteresis values of an upper threshold value ESZONEGH and a lower threshold value ESZONEGL are set at a threshold value ESZONEG that is the boundary between zone B1 and zone C. When the remaining capacity tends to increase, the upper threshold value acts as the boundary, and when the remaining capacity tends to decrease, the lower threshold value acts as the boundary.

Figure 7:
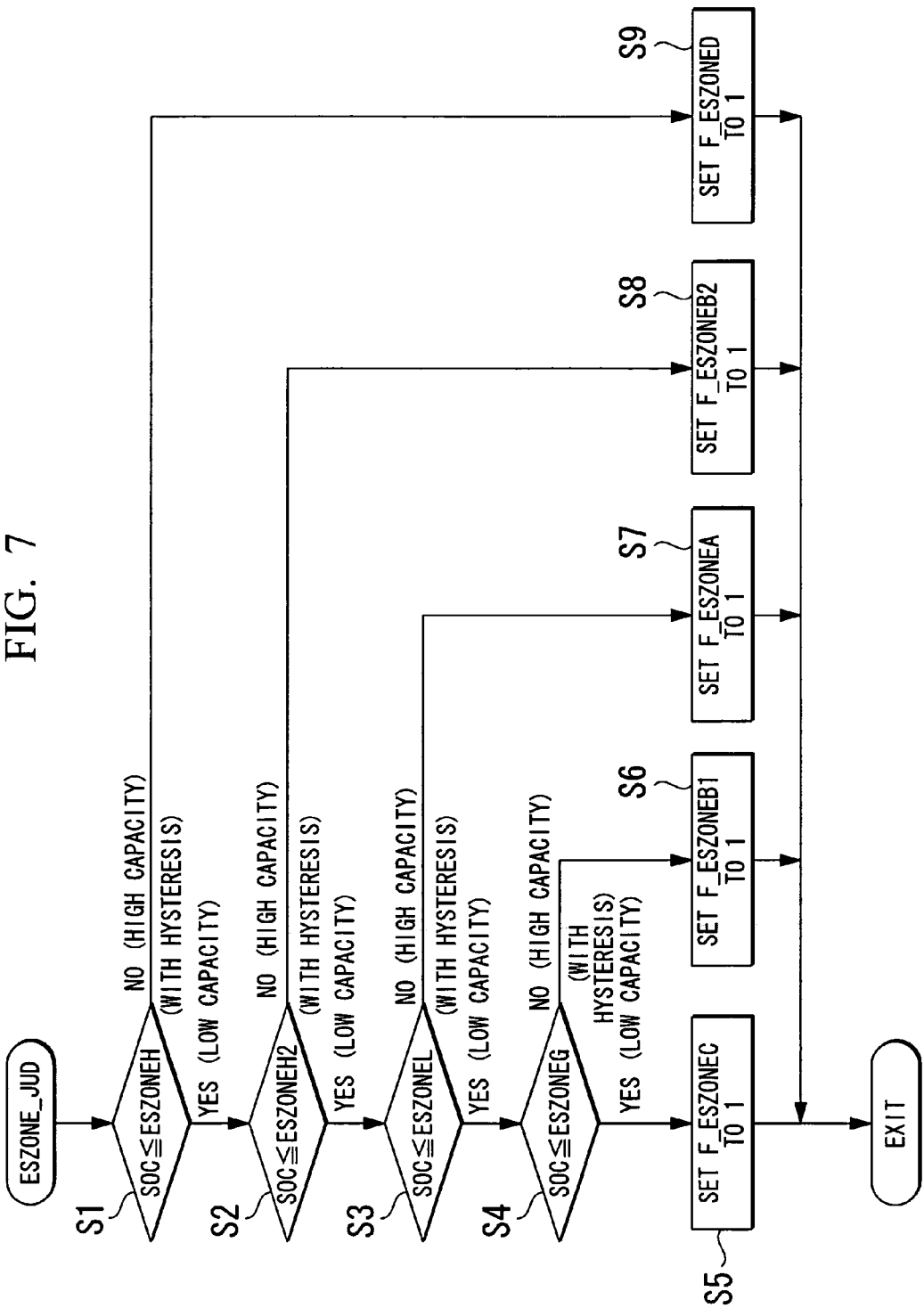
FIG. 7 is a flowchart that shows the process of zone determination.

A zone determination process (ESZONE_JUD) shall now be described based on the flowchart shown in FIG. 7. This determination is performed at each predetermined time. Also, in the process below, the aforementioned hysteresis is added to the threshold value that determines a zone.

In step S1, it is determined whether or not the remaining battery capacity SOC is equal to or less than the threshold value ESZONEH, which is the boundary between zone B2 and zone D. If the result of the determination is "YES", the process proceeds to step S2, while if the result of the determination is "NO", the process proceeds to step S9. At step S9, the value of the zone D flag F_ESZONED is set to "1", and the process terminates.

In step S2, it is determined whether or not the remaining battery capacity SOC is equal to or less than the threshold value ESZONEH2, which is the boundary between zone A and zone B2. If the result of the determination is "YES", the process proceeds to step S3, while if the result of the determination is "NO", the process proceeds to step S8. At step S8, the value of the zone B2 flag F_ESZONEB2 is set to "1", and the process terminates.

In step S3, it is determined whether or not the remaining battery capacity SOC is equal to or less than the threshold value ESZONEL, which is the boundary between zone B1 and zone A. If the result of the determination is "YES", the process proceeds to step S4, while if the result of the determination is "NO", the process proceeds to step S7. At step S7, the value of the zone A flag F_ESZONEA is set to "1", and the process terminates.

In step S4, it is determined whether or not the remaining battery capacity SOC is equal to or less than the threshold value ESZONEG, which is the boundary between zone C and zone B1. If the result of the determination is "YES", the process proceeds to step S5, where the value of the zone C flag F_ESZONEC is set to "1", and the process terminates.

Also, if the result of the determination in step S4 is "NO", the process proceeds to step S6. At step S6, the value of the zone B1 flag F_ESZONEB1 is set to "1", and the process terminates.

Figure 8:
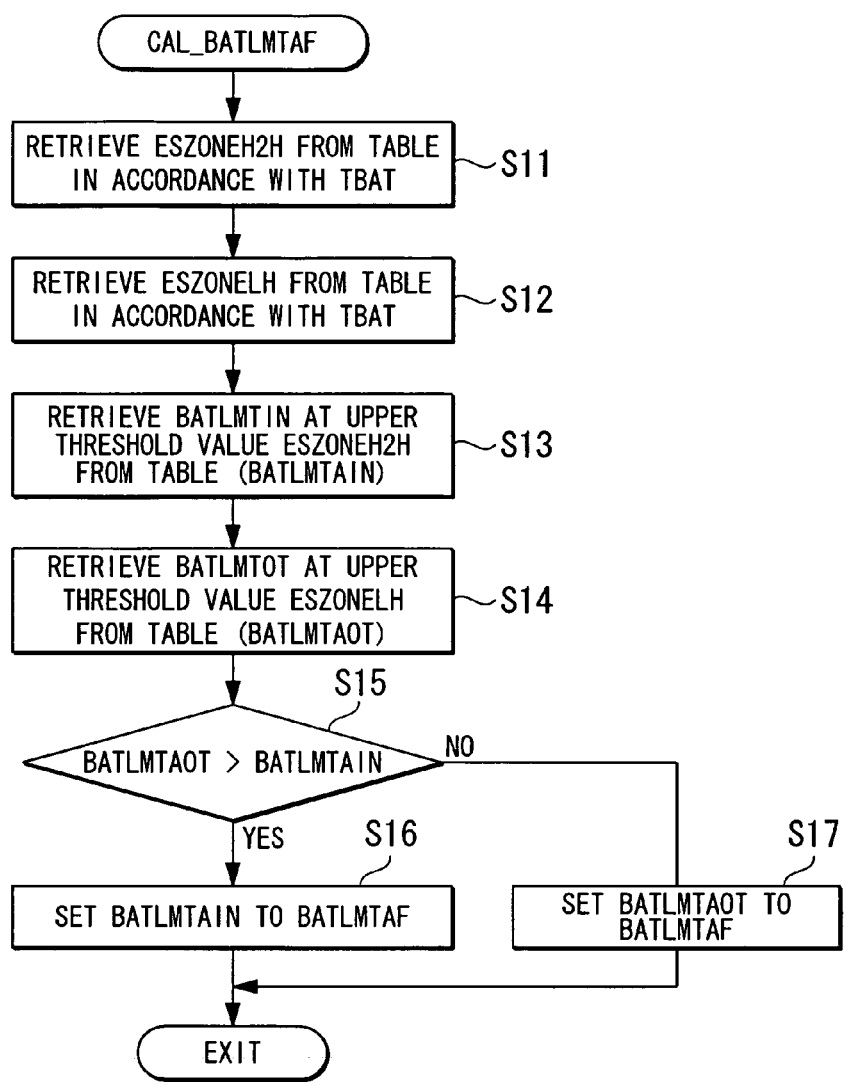
FIG. 8 is a flowchart that shows the process of calculating the upper-limit value of the final controlled charge/discharge quantity in zone A.

A calculating process for a zone A final controlled charge/discharge amount upper-limit value (CAL_BATLMTAF) shall be described based on the flowchart in FIG. 8. This determination is performed at each predetermined time. When executing this process, since the upper-limit value of zone A is set according to the charge/discharge lines drawn in the charge/discharge power tables of FIGS. 3 to 5 determined in accordance with the battery temperature TBAT, the description will for convenience refer to the graph of FIG. 9 (which has the same axes as FIGS. 3 to 5) with the intent of representing FIGS. 3 to 5.

In step S11, the upper limit threshold value ESZONEH2 of the remaining capacity of zone A in accordance with the battery temperature TBAT (that is, the upper threshold value ESZONEH2H) is retrieved from the graph (table) in FIG. 6, and the operation proceeds to step S12. Thereby, a point "a" in FIG. 9 is determined.

In step S12, the lower limit threshold value ESZONEL of the remaining capacity of zone A in accordance with the battery temperature TBAT (that is, the upper threshold value ESZONELH) is retrieved from the graph (table) in FIG. 6, and the operation proceeds to step S13. Thereby, a point "b" in FIG. 9 is determined.

Figure 9:
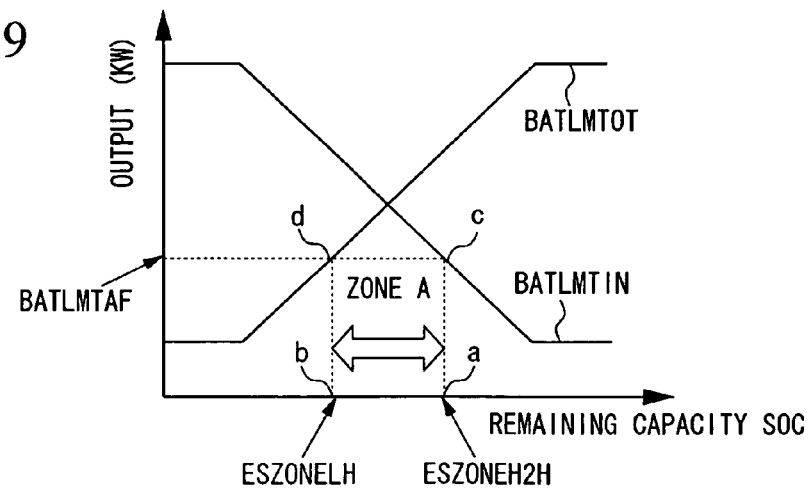
FIG. 9 is a graph that shows the determination of zone A.

In step S13, a battery standalone charge amount upper-limit value BATLMTIN at the upper threshold value ESZONEH2H that is found in step S11 is retrieved from the corresponding graph (table) among FIGS. 3 to 5 selected according to the battery temperature TBAT (point "c" in FIG. 9). This is assigned to a zone A controlled charge amount upper-limit value BATLMTAIN and the operation proceeds to step S14.

In step S14, a battery standalone discharge amount upper-limit value BATLMTOT at the upper threshold value ESZONELH that is found in step S12 is retrieved from the corresponding graph (table) among FIGS. 3 to 5 selected according to the battery temperature TBAT (point "d" in FIG. 9). This is assigned to a zone A controlled discharge amount upper-limit value BATLMTAOT and the operation proceeds to step S14.

At step S15, it is determined whether or not the zone A controlled discharge amount upper-limit value BAFLMTAOT is greater than the zone A controlled charge amount upper-limit value BATLMTAIN. If the result of the determination is "YES", the operation proceeds to step S16, and if the result of the determination is "NO", the operation proceeds to step S17.

At step S16, the control is completed by making the zone A controlled charge amount upper-limit value BATLMTAIN, which is the smaller value in step S15, serve as the zone A final controlled charge/discharge amount upper-limit value (predetermined value) BATLMTAF.

At step S17, the control is completed by making the zone A controlled discharge amount upper-limit value BATLMTAOT, which is the smaller value in step S15, serve as the zone A final controlled charge/discharge amount upper-limit value BATLMTAF.

Figure 10:
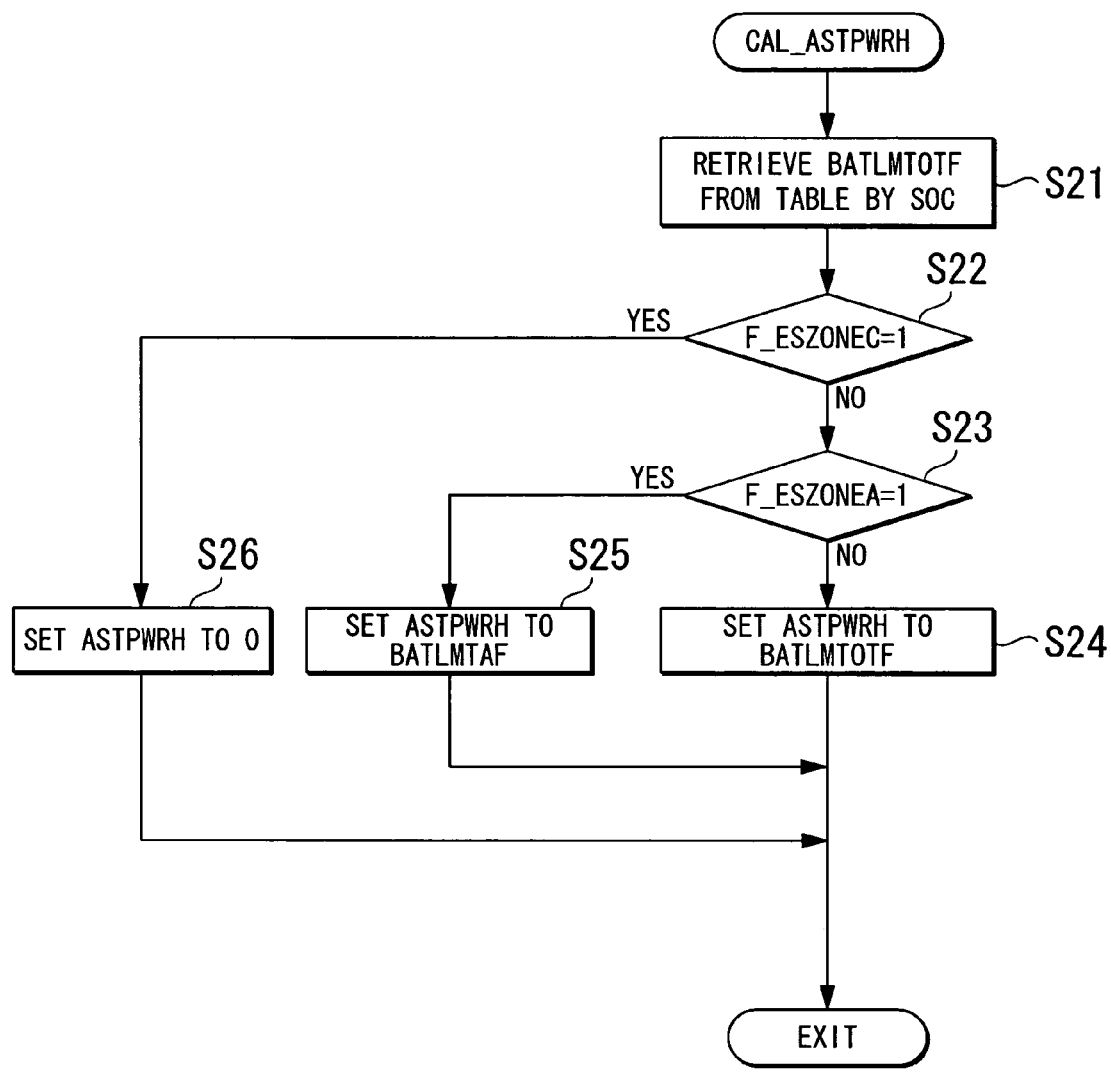
FIG. 10 is a flowchart that shows the process of calculating the upper limit of the final assistance amount (capable of output/discharge).

Next, the final assistance amount (outputtable/dischargable) upper-limit value calculating process (CAL_ASTPWRH) shall be described with reference to the flowchart of FIG. 10.

In step S21, the final controlled discharge amount upper-limit value BATLMTOTF that corresponds to the remaining battery capacity SOC is retrieved from the graph (table) among FIGS. 3 to 5 selected according to the battery temperature TBAT.

Next, in step S22, it is determined whether or not the zone C flag F_ESZONEC is "1". If the result of the determination is "YES", the operation proceeds to step S26, and if the result of the determination is "NO", the operation proceeds to step S23. In step S26, the final assistance amount (outputtable) upper-limit value ASTPWRH is set to "0", which should prevent discharging at zone C, and the processing is terminated.

In step S23, it is determined whether or not the zone A flag F_ESZONEA is "1". If the result of the determination is "YES", the operation proceeds to step S25, and if the result of the determination is "NO", the operation proceeds to step S24. At step S25, the final assistance amount (outputtable) upper-limit value ASTPWRH, which should set the upper-limit value of the charge/discharge amount in zone A, is set to the zone A final controlled charge/discharge amount upper-limit value BATLMTAF at which the charging and discharging are fixed values, and the processing is terminated.

Also, at step S24, the final assistance amount (outputable) upper-limit value ASTPWRH, which should set the upper-limit value of the discharge amount at zones D, B2, and B1, is set to the final controlled discharge amount upper-limit value BATLMTOTF that is a retrieved value, and the processing is terminated.

Figure 11:
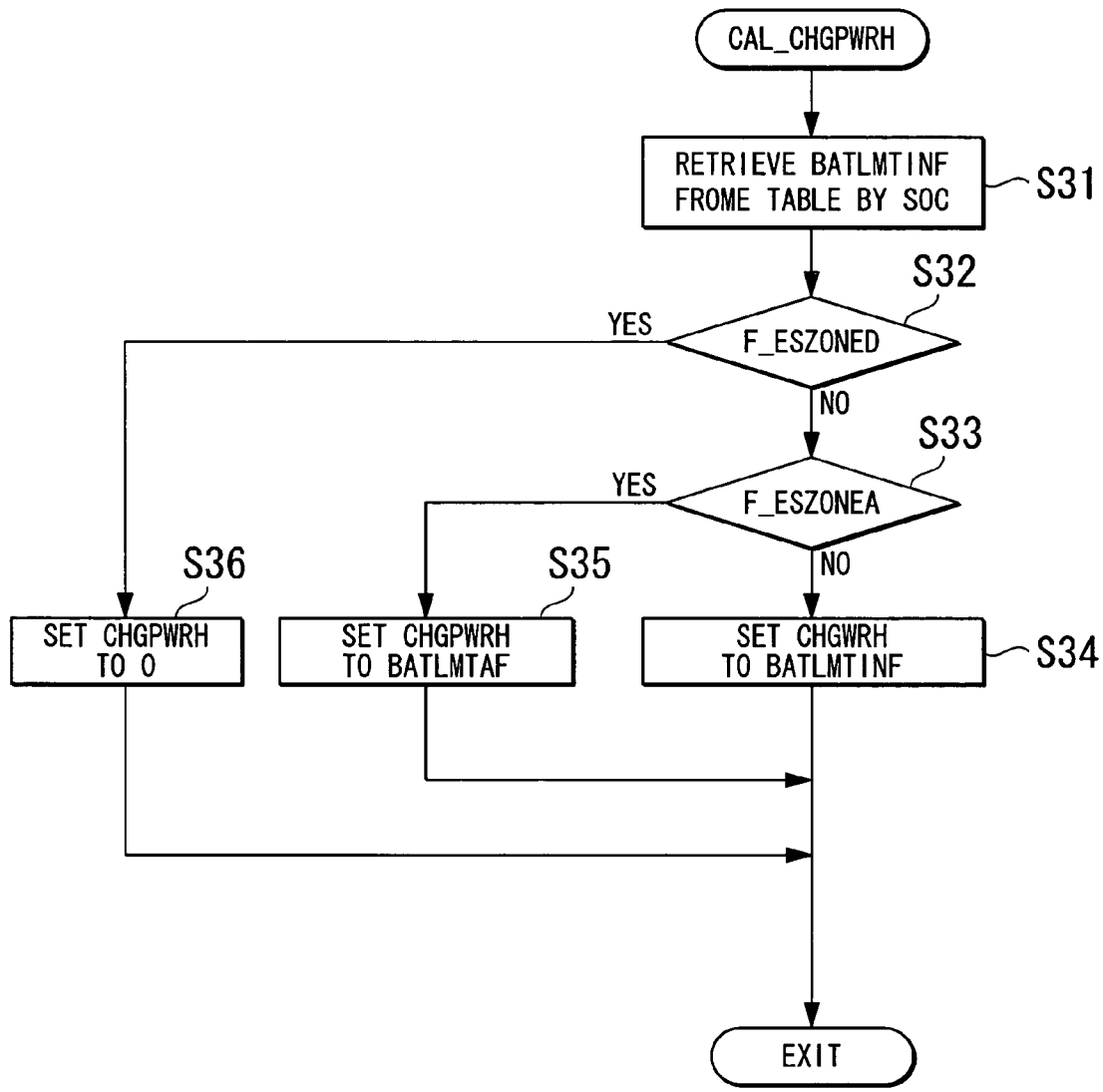
FIG. 11 is a flowchart that shows the process of calculating the upper limit of the final charging amount (capable of input/charge).

Next, the upper limit calculation process (CAL_CHGPWRH) of the final charge amount (inputtable/chargeable) shall be described with reference to the flowchart of FIG. 11.

In step S31, the final controlled charge amount upper-limit value BATLMTINF that corresponds to the remaining battery capacity SOC is retrieved from the graph (table) among FIGS. 3 to 5 selected according to the battery temperature TBAT.

Next, in step S32, it is determined whether or not the zone D flag F_ESZONED is "1". If the result of the determination is "YES", the operation proceeds to step S36, and if the result of the determination is "NO", the operation proceeds to step S33. In step S36, the final charge amount (inputtable/chargeable) upper-limit value CHGPWRH is set to "0", which should prevent charging at zone D, and the processing is terminated.

In step S33, it is determined whether or not the zone A flag F_ESZONEA is "1". If the result of the determination is "YES", the operation proceeds to step S35, and if the result of the determination is "NO", the operation proceeds to step S34. At step S35, the final charge amount (inputtable/chargeable) upper-limit value CHGPWRH, which should set the upper-limit value of the charge/discharge amount in zone A, is set to the zone A final controlled charge/discharge amount upper-limit value BATLMTAF at which the charging and discharging are fixed values, and the processing is terminated.

Also, at step S34, the final charge amount (inputtable/chargeable) upper-limit value CHGPWRH, which should set the upper-limit value of the charge amount at zones B2, B1, and C, is set to the final controlled charge amount upper-limit value BATLMTINF that is a retrieved value, and the processing is terminated.

Figure 12:
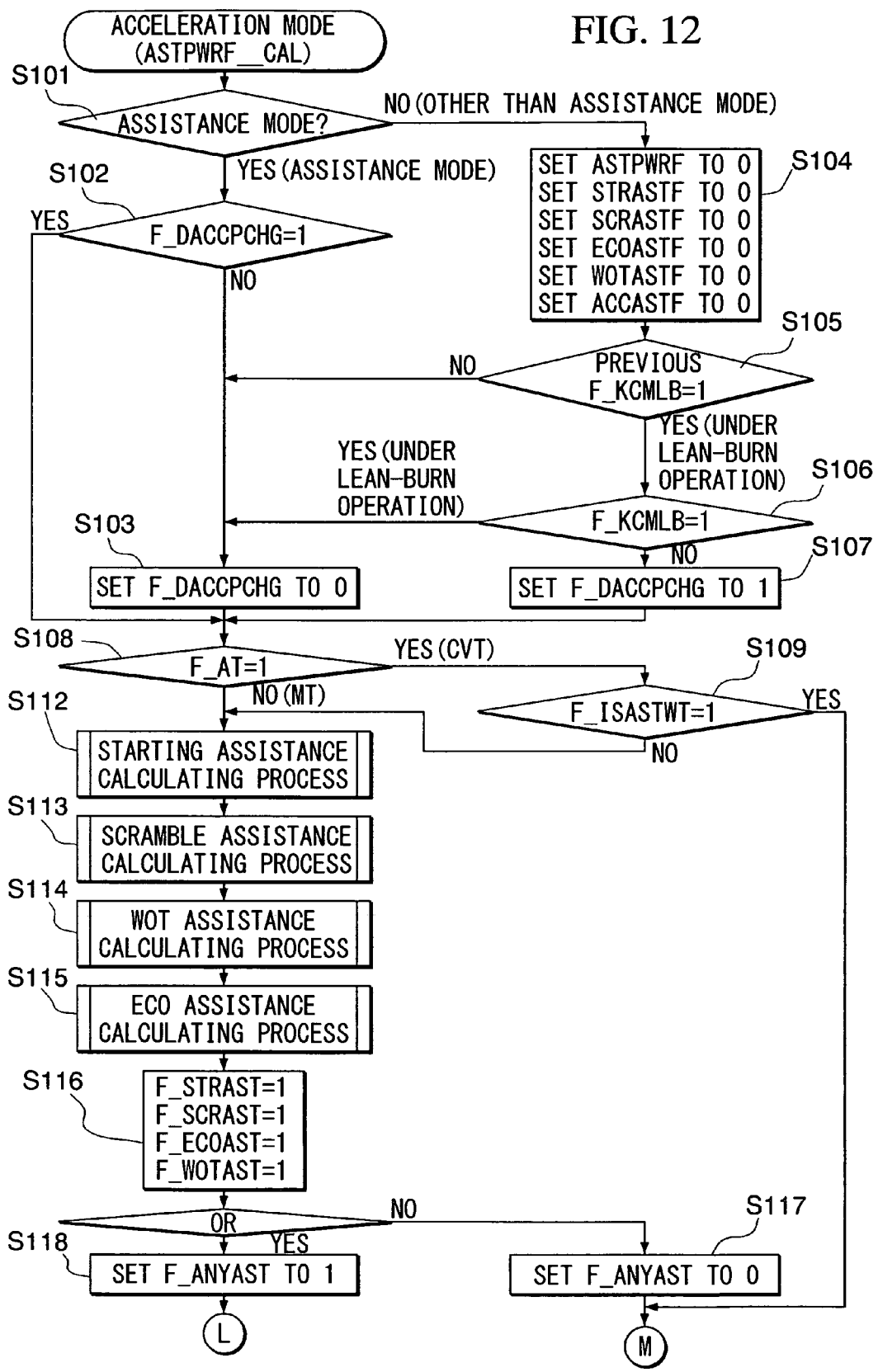
FIG. 12 is a flowchart that shows the process of calculating the assistance amount in the acceleration (assistance) mode.
Figure 13:
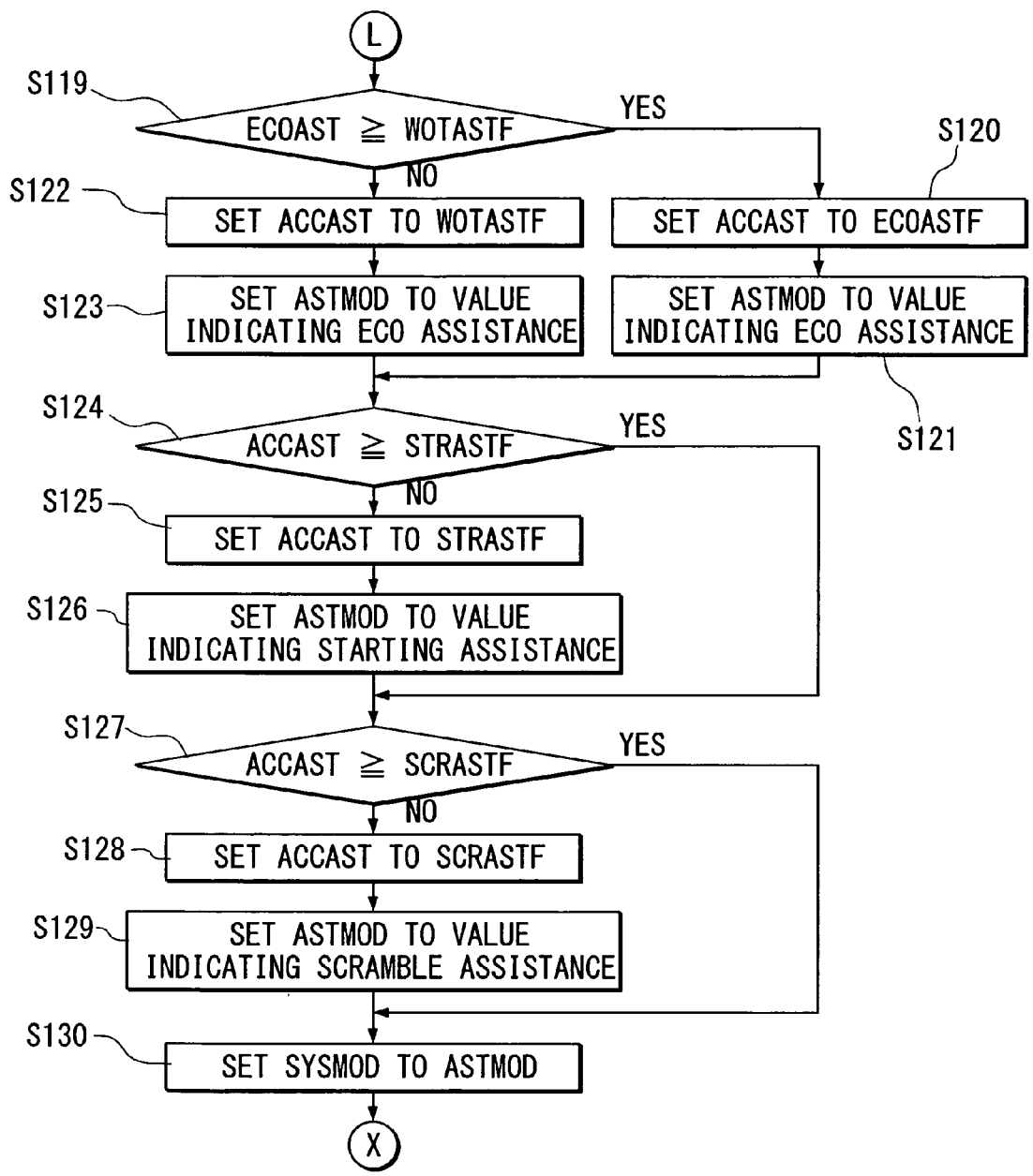
FIG. 13 is a flowchart that shows the process of calculating the assistance amount in the acceleration (assistance) mode.
Figure 14:
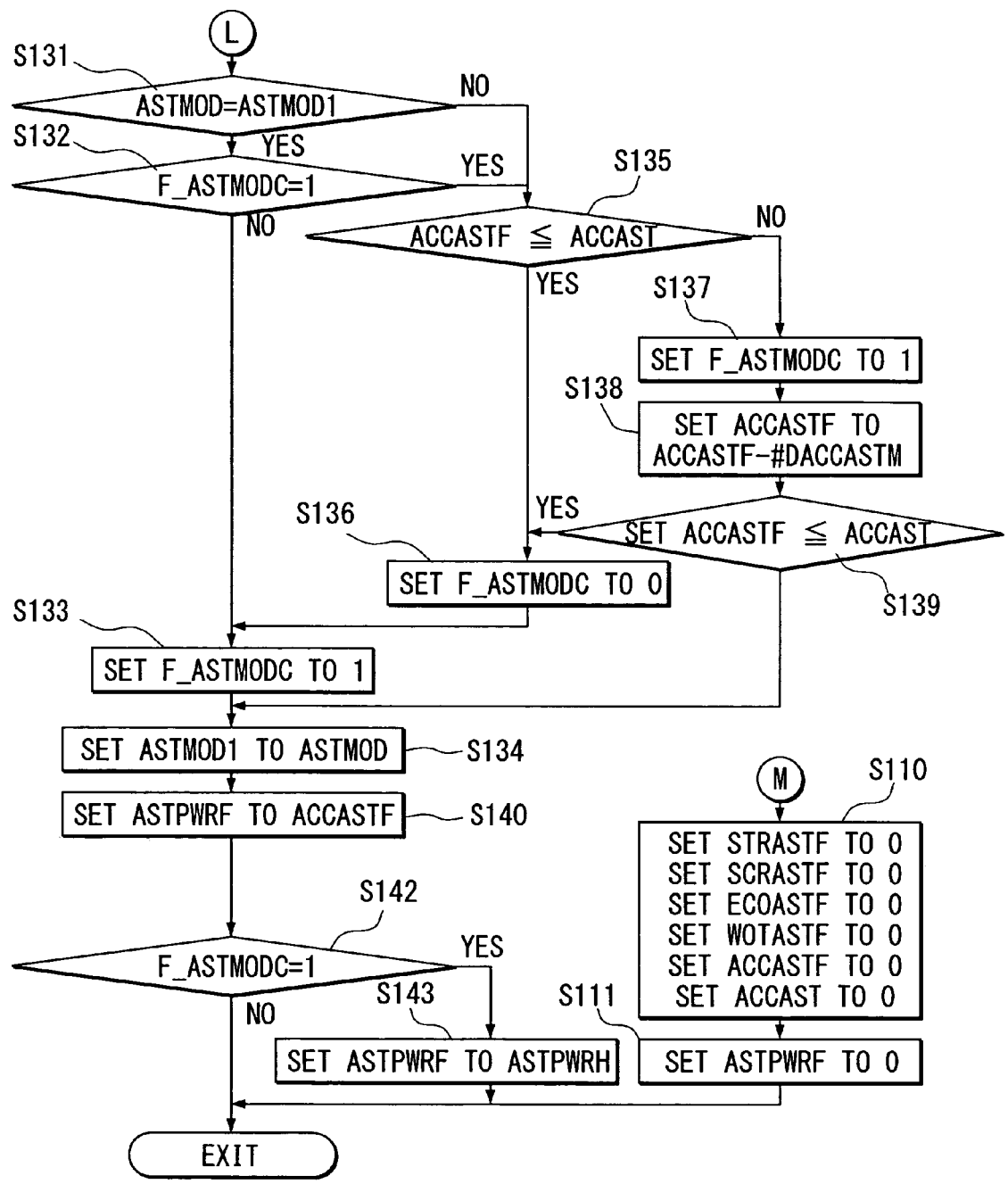
FIG. 14 is a flowchart that shows the process of calculating the assistance amount in the acceleration (assistance) mode.

Next, the assistance amount calculation process (ASTPWRF_CAL) in the acceleration (assistance) mode in which the engine E is drive assisted by the motor M shall be described based on the flowcharts of FIGS. 12 to 14.

In step S101, it is determined whether the output of the engine E is assisted in the acceleration mode. If the result of the determination is "YES" (i.e., assistance mode), the operation proceeds to step S102. On the other hand, if the result of the determination is "NO" (other modes in which assistance is not performed), the operation proceeds to step S104 described below.

In step S102, it is determined whether the value of the assistance establishment recognition flag F_DACCPCHG is "1". When the assistance is established due to switching from the combustion based on the theoretical (or stoichiometric) mixture ratio to the lean burn combustion, the driver may feel a sudden change in the engine output. That is, the assistance establishment recognition flag F_DACCPCHG is used when the air-fuel ratio is changed, so as to prevent such a sudden change in the driver's feeling.

If the result of the determination of step S102 is "YES", the operation proceeds to step S108.

If the result of the determination is "NO", the operation proceeds to step S103, where the value of the assistance establishment recognition flag F_DACCPCHG is set to "0", and the operation proceeds to step S108.

In step S104, a final assistance command value ASTPWRF, a final starting assistance command value STRASTF, a final scramble assistance command value SCRASTF, a final ECO assistance command value ECOASTF, a final WOT assistance command value WOTASTF, and a final acceleration assistance command value ACCASTF are each set to "0".

The starting assistance serves to assist the engine E when the vehicle is started, typically when the absolute value of the air-intake passage negative pressure is equal to or greater than a predetermined level (i.e., in a high load state) with the object of improving the starting performance. The scramble assistance serves to assist the engine E in order to improve the feeling of acceleration (of the passengers) by temporarily increasing the amount of power assistance while the vehicle is accelerated under predetermined conditions, such as the amount of change in the degree of throttle opening being equal to or greater than a predetermined amount of change. Also, the ECO assistance serves to assist the engine in accordance with the air-intake passage negative pressure prior to the full-open state of the engine E. The WOT assistance serves to assist the engine E by increasing the amount of fuel supplied to the engine E by an amount defined by a wide-open fuel increase coefficient after the engine is in the wide-open state.

In step S105, it is determined whether or not the previous value of the lean-burn determination flag F_KCMLB (i.e., the flag value detected when the process was executed last time) is "1".

If the result of the determination is "NO", the operation proceeds to step S103.

If the result of the determination is "YES" (i.e., under lean-burn operation), the operation proceeds to step S106.

In step S106, it is determined whether the value of the lean-burn determination flag F_KCMLB is "1".

If the result of the determination is "YES", that is, when the lean-burn operation has been continued, the operation proceeds to the above-explained step S103.

If the result of the determination of step S106 is "NO", that is, the combustion has been switched from the lean-burn combustion to the combustion based on the theoretical mixture ratio, then the operation proceeds to step S107. In step S107, the value of the assistance establishment recognition flag F_DACCPCHG (used when the air-fuel ratio is switched) is set to "1", and the operation proceeds to step S108.

In step S108, it is determined whether the value of the MT/CVT determination flag F_AT is "1".

If the result of the determination is "YES" (i.e., CVT vehicle), the operation proceeds to step S109, where it is determined whether the value of the flag F_ISASTWT is "1", where this flag is used for requesting the assistance standby state when the vehicle is started from the idle-stop mode.

If the result of the determination of step S109 is "YES", the operation proceeds to step S110, where the final starting assistance command value STRASTF, the final scramble assistance command value SCRASTF, the final ECO assistance command value ECOASTF, the final WOT assistance command value WOTASTF, the final acceleration assistance command value ACCASTF, and the acceleration assistance command value ACCAST are each set to "0". The operation proceeds to step S111, where the final assistance command value ASTPWRF is set to "0", and the process of this flow is terminated.

If the result of the determination in step S108 is "NO" (i.e., MT vehicle), or if the result of the determination in the above step S109 is "NO", the operation proceeds to step S112.

In step S112, the starting assistance calculating process is performed, in which the final starting assistance command value STRASTF is calculated as the amount of (power) assistance when the vehicle is started while the absolute value PBGA of the air-intake passage negative pressure PBG is equal to or greater than a predetermined level (i.e., in a high load state).

If the vehicle is an MT vehicle, the amount of assistance is calculated based on the absolute value PBGA of the air-intake passage negative pressure PBG If the vehicle is a CVT vehicle, the amount of assistance is calculated based on the current value THEM of the degree of throttle opening.

In addition, if the value of the starting motor-assistance determining flag F_MASTSTR is "1", that is, when the starting assistance is requested, the value of the starting assistance flag F_STRAST is set to "1".

In the next step S113, the scramble assistance calculating process is performed. In this process, the final scramble assistance command value SCRASTF is calculated as the amount of assistance used for temporarily increasing the amount of assistance during acceleration under predetermined conditions, typically when the amount of change DTHEM of the degree of throttle opening is equal to or greater than a predetermined amount of change #DTHSCAST.

If the vehicle is an MT vehicle, the amount of assistance is calculated based on the control engine speed NEAST (for control use) and each selected gear. If the vehicle is a CVT vehicle, the amount of assistance is calculated based on the control engine speed NEAST (for control use). In addition, this amount of assistance is corrected according to the usable zone with respect to the remaining battery capacity SOC.

If the value of the scramble motor-assistance determining flag F_MASTSCR is "1", that is, when the scramble assistance is requested, the value of the scramble assistance flag F_SCRAST is set to "1".

In the next step S114, the WOT (wide open throttle) assistance calculating process is performed. In the process, the final WOT assistance command value WOTASTF is calculated as the amount of assistance used when the air-intake passage negative pressure PB is the critical point or higher.

The amount of assistance is calculated based on the engine speed NE and the current value THEM of the degree of throttle opening TH. Furthermore, the amount of assistance is further corrected according to the usable zone of the remaining battery capacity SOC.

In addition, when the value of the WOT motor-assistance determining flag F_MASTWOT is "1", that is, when the WOT assistance is requested, the value of the WOT assistance flag F_WOTAST is set to "1" in accordance with, for example, the remaining battery capacity SOC or the like.

In the following step S115, the ECO assistance calculating process is executed. The ECO assistance indicates the assistance performed when the load of the engine (i.e., internal combustion engine) is relatively low. In the ECO assistance calculating process, the ECO assistance command value ECOAST and the final ECO assistance command value ECOASTF are calculated as the amounts of assistance used in the ECO assistance.

The amount of assistance is calculated based on the engine speed NE and the absolute value of the air-intake passage negative pressure PB. Furthermore, the amount of assistance is corrected according to the usable zone of the remaining battery capacity SOC.

In addition, if the vehicle is an MT vehicle and the value of the motor-assistance determining flag F_MASTPB with respect to the air-intake passage negative pressure is "1", or if the vehicle is a CVT vehicle and the value of the throttle motor-assistance determining flag F_MASTTH is "1", then the value of the ECO assistance flag F_ECOAST is set to "1" under predetermined conditions, for example, based on the remaining battery capacity SOC or the like.

In the next step S116, it is determined whether or not any of (i) the starting assistance flag F_STRAST for commanding execution of the starting assistance, (ii) the scramble assistance flag F_SCRAST for commanding execution of the scramble assistance, (iii) the WOT assistance flag F_WOTAST for commanding execution of assistance in the above-explained WOT (wide open throttle) control, and (iv) the ECO assistance flag F_ECOAST for commanding execution of assistance in a low load state, has a value of "1".

If the result of the determination is "NO", the operation proceeds to step S117, where the value of the assistance execution permitting flag F_ANYAST is set to "0". This flag F_ANYAST is used for permitting any of the above-defined assistance operations (when the flag value is 1). The operation then proceeds to the above-explained step S110.

On the other hand, if the result of the determination of step S116 is "YES", the operation proceeds to step S118, where the value of the assistance execution permitting flag F_ANYAST is set to "1", and the operation proceeds to step S119.

In step S119 shown in FIG. 13, it is determined whether the ECO assistance command value ECOAST is equal to or greater than the final WOT assistance command value WOTASTF.

If the result of the determination is "YES", the operation proceeds to step S120. In step S120, the acceleration assistance command value ACCAST (i.e., assistance command value in the acceleration mode) is set to the final ECO assistance command value ECOASTF, and the operation proceeds to step S121. In step S121, the assistance mode set value ASTMOD is set to a value indicating the ECO assistance in which the output of the engine E is assisted in a low load state. The operation then proceeds to step S124 (explained below).

If the result of the determination of step S119 is "NO", the operation proceeds to step S122, where the acceleration assistance command value ACCAST is set to the final WOT assistance command value WOTASTF. The operation then proceeds to step S123, where the assistance mode set value ASTMOD is set to a value indicating the WOT assistance in which the output of the engine E is assisted in the above-explained WOT control. The operation then proceeds to step S124.

In step S124, it is determined whether the acceleration assistance command value ACCAST is equal to or greater than the final starting assistance command value STRASTF.

If the result of the determination is "YES", the operation proceeds to step S127, which is explained below.

If the result of the determination is "NO", the operation proceeds to step S125, where the acceleration assistance command value ACCAST is set to the final starting assistance command value STRASTF, and the operation proceeds to step S126. In step S126, the assistance mode set value ASTMOD is set to a value indicating the starting assistance in which the output of the engine E is assisted when the vehicle is started. The operation then proceeds to step S127.

In step S127, it is determined whether the acceleration assistance command value ACCAST is equal to or greater than the final scramble assistance command value SCRASTF.

If the result of the determination is "YES", the operation proceeds to step S130, which is explained below.

On the other hand, it the result of the determination is "NO", the operation proceeds to step S128, where the acceleration assistance command value ACCAST is set to the final scramble assistance command value SCRASTF, and the operation proceeds to step S129. In step S129 the assistance mode set value ASTMOD is set to a value indicating the scramble assistance in which the output of the engine E is temporarily assisted while the vehicle is accelerated under predetermined conditions. The operation then proceeds to step S130.

In step S130, the system state set value SYSMOD, which is used for setting the state of the system, is set to the assistance mode set value ASTMOD.

In step S131 shown in FIG. 14, it is determined whether or not the previous assistance mode set value ASTMOD1, which was set when the process was executed last time, equals the current assistance mode set value ASTMOD.

If the result of the determination is "NO", the operation proceeds to step S135 that is explained below.

On the other hand, if the result of the determination is "YES", the operation proceeds to step S132, where it is determined whether the value of the assistance mode change flag F_ASTMODC, which is used for designating whether or not the mode should be changed, is "1".

If the result of the determination in step S132 is "YES", the operation proceeds to step S135 which is explained below.

On the other hand, if the result of the determination in step S132 is "NO", the operation proceeds to step S133.

In step S133, the final acceleration assistance command value ACCASTF is set to the acceleration assistance command value ACCAST.

In the next step S134, the (previous) assistance mode set value ASTMOD1 is set to the assistance mode set value ASTMOD, and the operation proceeds to step S140 that is explained below.

If the result of the determination in step S131 is that the current assistance mode set value ASTMOD differs from the previous assistance mode set value ASTMOD1, or the result of the determination of step S132 is that the value of the assistance mode change flag F_ASTMODC is "1", step S135 is performed. In this step S135, it is determined whether or not the final acceleration assistance command value ACCASTF is equal to or less than the acceleration assistance command value ACCAST.

If the result of the determination is "YES", that is, when the acceleration assistance command value ACCAST, which has been set this time, is equal to or greater than the final acceleration assistance command value ACCASTF, which was set last time (i.e., when the process was performed last time), then the operation proceeds to step S136. In step S136, the value of the assistance mode change flag F_ASTMODC is set to "0", and the operation proceeds to the above-explained step S133.

If the result of the determination in step S135 is "NO", that is, when the acceleration assistance command value ACCAST set in the current process is less than the previous final acceleration assistance command value ACCASTF, the operation proceeds to step S137. In step S137, the value of the assistance mode change flag F_ASTMODC is set to "1", and the operation proceeds to step S138.

In step S138, the final acceleration assistance command value ACCASTF is set to a value obtained by subtracting the predetermined assistance command subtraction value #DACCASTM from the final acceleration assistance command value ACCASTF (which was set when the process was executed last time). The operation then proceeds to step S139.

In step S139, it is determined whether or not the final acceleration assistance command value ACCASTF is equal to or less than the acceleration assistance command value ACCAST.

If the result of the determination is "YES", that is, when the final acceleration assistance command value ACCASTF, which has been gradually decreased, has reached the acceleration assistance command value ACCAST, the operation proceeds to the above-explained step S136.

On the other hand, if the result of the determination of step S139 is "NO", the operation proceeds to the above-explained step S134.

That is, when the assistance mode is changed, in particular, if the amount of assistance is decreased in comparison with the amount of assistance in the last operation (i.e., when the process was executed last time), then the amount of assistance is gradually decreased using the predetermined assistance command subtraction value #DACCASTM. Accordingly, even when the assistance mode is changed, it is possible to prevent the passengers of the vehicle from feeling a sudden change in acceleration, thereby realizing smooth accelerating performance.

In step S140, the final assistance command value ASTPWRF is set to the final acceleration assistance command value ACCASTF.

In step S142, it is determined whether or not the final assistance command value ASTPWRF is equal to or greater than the final assistance amount (outputtable) upper-limit value ASTPWRH, in which the upper-limit value of the discharge amount of the battery 3 is set.

If the result of the determination is "NO", the process of this flow is terminated.

On the other hand, if the result of the determination of step S142 is "YES", the operation proceeds to step S143, where the final assistance command value ASTPWRF is set to the final assistance amount (outputtable) upper-limit value ASTPWRH, and the process is completed.

Accordingly, even when the final assistance command value ASTPWRF that is set in accordance with the type of assistance takes any value, since it does not exceed the final assistance amount (outputtable) upper-limit value ASTPWRH that is capable of being output (discharged) by the battery 3, it is possible to use the battery 3 in its optimal condition.

Next, the process of calculating the target regeneration amount in the deceleration mode in which regenerative braking is performed using the motor M (DECRGN_OBJ) will be explained with reference to the flowcharts of FIG. 15 and FIG. 16.

Figure 15:
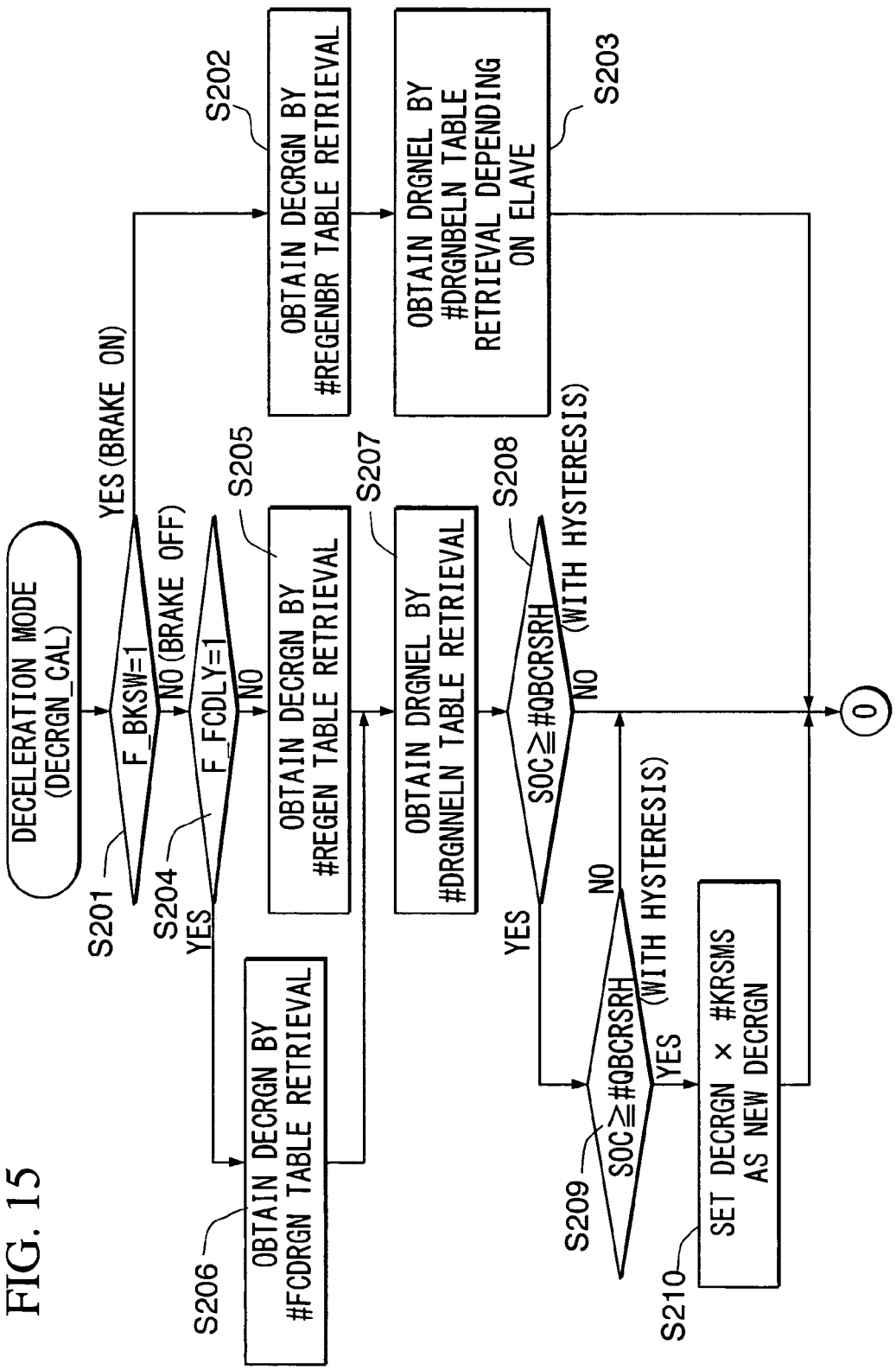
FIG. 15 is a flowchart that shows the process of calculating the target regeneration amount in the deceleration mode.

At first, in step S201 shown in FIG. 15, it is determined whether a brake switch flag F_BKSW is "1" or not.

In the case where the result of the determination is "NO", that is, in the case where the brake switch is OFF, the operation proceeds to step S204 described below. On the other hand, in the case where the result of the determination is "YES", that is, in the case where the brake switch is ON, the operation proceeds to step S202.

In step S202, a deceleration regeneration computation value DECRGN is obtained by table retrieval from a #REGENBR table which differs depending on whether for a MT or a CVT, and depending on ON/OFF switching of various auxiliary components such as a compressor of an air conditioner that constitutes an air-conditioning system driven by the engine E.

In step S203, a deceleration regeneration correction amount DRGNEL which changes with an increasing tendency accompanying an increase of a mean consumption current ELAVE, is obtained by table retrieval from a #DRGNBELN table. The flow then proceeds to a step S210A described below. The mean consumption current ELAVE is used when the regeneration amount is increased accompanying an increase in the consumption current of the auxiliary battery 4.

In step S204, it is determined whether or not the fuel supply cut delay time regeneration flag F_FCDLY is "1" or not.

In the case where the determination is "NO", that is, in the case where regeneration is not performed in the fuel supply cut delay time, the operation proceeds to step S205. The deceleration regeneration calculation value DECRGN is obtained by table retrieval from a #REGEN table which changes with an increasing tendency accompanying an increase in vehicle speed VAST, and which differs depending on whether for an MT or an CVT, and depending on ON/OFF switching of various auxiliary components such as a compressor of an air conditioner that constitutes an air-conditioning system driven by the engine E. The operation then proceeds to a step S207 described below.

On the other hand, in the case where the result of the determination is "YES", that is, in the case where regeneration is performed in the fuel supply cut delay time, the operation proceeds to step S206. Then the deceleration regeneration calculation value DECRGN is obtained by table retrieval from a #FCDRGN table which changes with an increasing tendency accompanying an increase in vehicle speed VAST, and which differs depending on ON/OFF switching of various auxiliary components such as a compressor of an air conditioner that constitutes an air-conditioning system driven by the engine E.

Here, the #FCDRGN table is set so that particularly on the low vehicle speed side, it gives a value greater than the #REGEN table.

That is, at the time of vehicle deceleration with the brake in the OFF state, when the current value THEM for the degree of throttle opening TH is smaller than a predetermined deceleration mode throttle determination value #THRGNFC for when outside fuel supply is cut, the deceleration regeneration calculation value DECRGN is set based on the #FCDRGN table which gives a greater value than for the #REGEN table, particularly on the low vehicle speed side. As a result, energy recovery corresponding to operating conditions at the time of vehicle deceleration can be improved, and the feeling of deceleration in accordance with the intention of the driver can be made appropriate, so that the drivability can be improved.

In step S207 the deceleration regeneration correction amount DRGNEL which changes with an increasing tendency accompanying an increase of the mean consumption current ELAVE, is obtained by table retrieval from a #DRGNELN table.

In step S208, it is determined whether or not the remaining battery capacity SOC is greater than or equal to a predetermined remaining capacity #QBCRSRH.

In the case where the result of the determination is "NO", the operation proceeds to step S110A described below. On the other hand, in the case where the result of the determination is "YES", the operation proceeds to step S209. The predetermined remaining capacity #QBCRSRH is a value that has hysteresis.

In step S209, it is determined whether or not the vehicle speed VP is equal to or greater than a predetermined vehicle speed #VRSMS.

In the case where the result of the determination is "NO", the operation proceeds to step S210A described below. On the other hand, in the case where the result of the determination is "YES", the flow proceeds to step S210. The predetermined vehicle speed #VRSMS is a value that has hysteresis.

In step S210 a value for the deceleration regeneration calculation value DECRGN multiplied by a coefficient #KRSMS is made a new deceleration regeneration calculation value DECRGN, and the operation proceeds to step S211.

Figure 16:
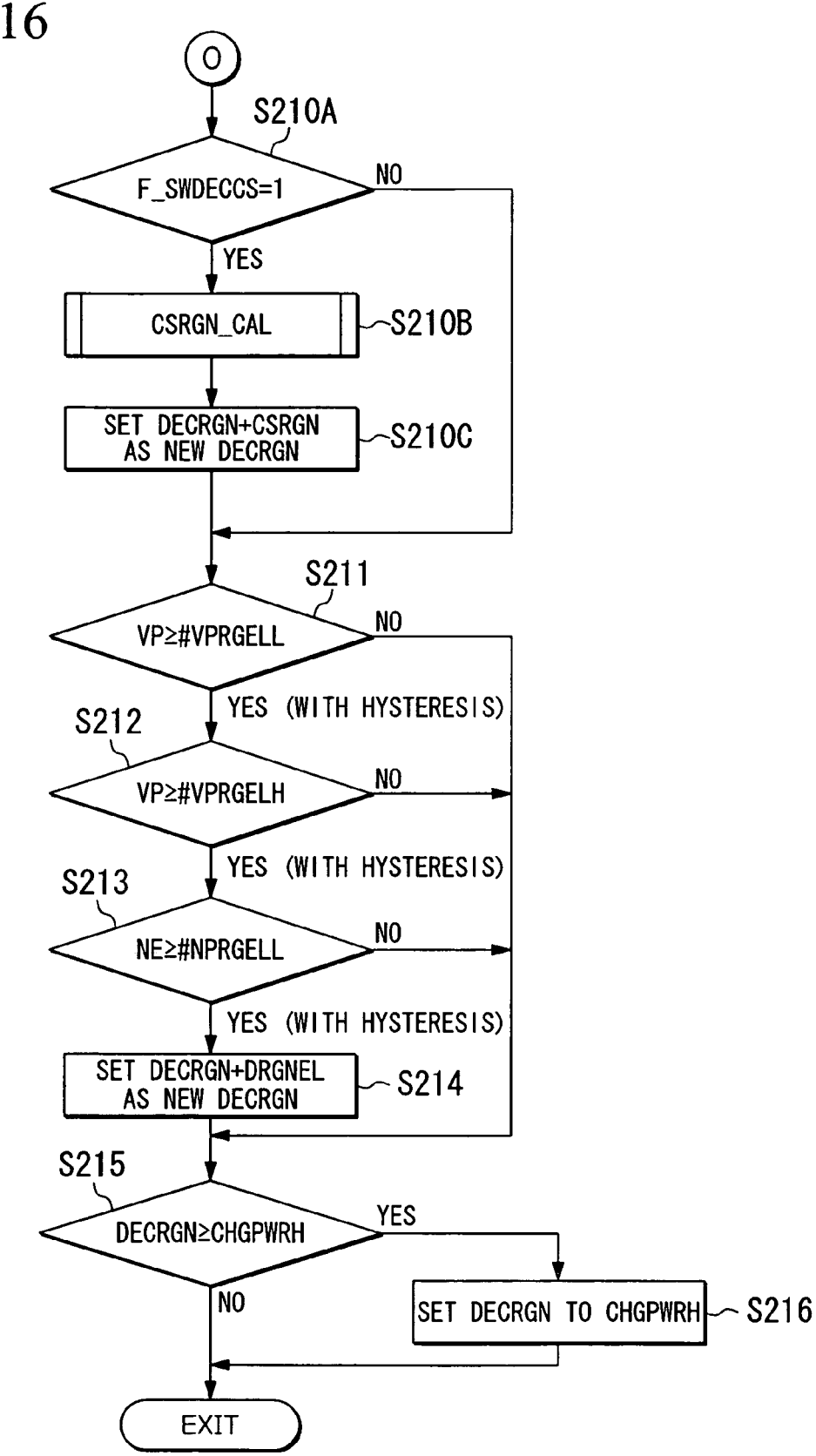
FIG. 16 is a flowchart that shows the process of calculating the target regeneration amount in the deceleration mode.

In step S210A shown in FIG. 16, it is determined whether or not a deceleration cylinder deactivation flag is "1".

In the case where the result of the determination is "YES", the operation proceeds to step S210B, and if the result of the determination is "NO", the operation proceeds to step S211. In step S210B, a cylinder deactivation regeneration calculation process (CSRGN_CAL) is performed, and the operation proceeds to step 210C.

In step S210C, a value obtained by adding the cylinder deactivation regeneration computation value CSRGN to the deceleration regeneration calculation value DECRGN is set as the new deceleration regeneration calculation value DECRGN, and the operation proceeds to step S211.

In step S211, it is determined whether or not the vehicle speed VP is equal to or greater than a predetermined value #VPRGELL.

In the case where the result of the determination is "NO", the flow proceeds to step S215 described below. On the other hand, in the case where the result of the determination is "YES", the flow proceeds to step S212.

In step S212, it is determined whether or not the vehicle speed VP is equal to or greater than a predetermined value #VPRGELH.

In the case where the result of the determination is "NO", the operation proceeds to step S215 described below. On the other hand, in the case where the result of the determination is "YES", the operation proceeds to step S213.

The predetermined value #VPRGELL and the predetermined value #VPRGELH are values having hysteresis.

In step S213, it is determined whether or not the engine revolution speed NE is equal to or greater than a predetermined value #NPRGELL.

In the case where the determination is "NO", the operation proceeds to the step S215 described below. On the other hand, in the case where the result of the determination is "YES", the operation proceeds to step S214, and a value obtained by adding a deceleration regeneration correction amount DRGNEL to the deceleration regeneration calculation value DECRGN is newly set as the deceleration regeneration calculation value DECRGN, and the operation proceeds to step S215.

As a result, in the case where the consumption current of the 12V system is large, the deceleration regeneration amount is increased so that the regeneration amount supply portion to the battery 3 is maintained. The predetermined value #NPRGELL is a value that has hysteresis.

In step S215, it is determined whether or not the deceleration regeneration calculation value DECRGN is equal to or greater than the final charge amount (inputtable/chargeable) upper-limit value CHGPWRH.

If the result of the determination is "NO", the process terminates.

On the other hand, if the result of the determination is "YES", the operation proceeds to step S216, where the deceleration regeneration calculation value DECRGN is set to the final charge amount (inputtable/chargeable) upper-limit value CHGPWRH, and the process terminates.

Accordingly, even when the deceleration regeneration calculation value DECRGN takes any value, since it does not exceed the final charge amount (inputtable/chargeable) upper-limit value CHGPWRH that is capable of being regenerated (charged) to the battery 3, it is possible to use the battery 3 in its optimal condition.

According to the present embodiment, since the zone A is set in a predetermined range that includes a remaining capacity SOC at which the zone A controlled discharge amount upper-limit value BATLMTAOT, which is the discharge output according to the remaining capacity SOC of the battery 3, and the zone A controlled charge amount upper-limit value BATLMTAIN, which is the charge input according to the remaining capacity SOC of the battery 3, are equivalent, the discharge output and the charge input in the zone A can be set near the upper-limit value, and it is possible to use both as the zone A final controlled charge/discharge amount upper-limit values BATLMTAF, which are approximately equivalent values. Therefore, while ensuring the discharge output and the charge input are as large as possible, it is possible to readily balance the discharge output and the charge input and simultaneously achieve an increase in energy and fuel efficiency.

Also, when the temperature of the battery 3 is high, the boundary portion between the zone D and the zone B2 that shows the remaining capacity value that stops charging may be changed to the low capacity side, to thereby enable stopping of charging in the state of the remaining capacity SOC being restricted to some extent. Therefore, even when the battery 3 is left as it is over an extended period under a high temperature, it is possible to reliably prevent performance changes that arise when the battery 3 is left as it is by holding the remaining capacity SOC to a low capacity so that performance changes do not occur.

When the temperature of the battery 3 is low, by narrowing the range of the zone A, this constitution enables raising of the temperature of the battery 3 with discharge energy when performing control so that the battery 3, when in the zone B2 and the zone D, returns to the zone A by relatively increasing the range of the zone B2 and the zone D that are set to the upper side of the zone A. Also, when the temperature of the battery 3 is low, this constitution enables raising of the temperature of the battery 3 with charge energy when performing control so that the battery 3, when in the zone B1 and the zone C, returns to the zone A by relatively increasing the range of the zone B1 and the zone C are set to the lower side of the zone A. Therefore, it is possible to quickly warm the battery 3 when the battery 3 is at a low temperature.

When the temperature of the battery 3 is low, the boundary portion between the zone C and the zone B1 that shows the remaining capacity value that stops discharging may be changed to the high capacity side, to thereby enable stopping of discharging in the state of the remaining capacity SOC being ensured to some extent. Therefore, it is possible to ensure a minimum output of the battery 3 even when used in low temperatures where it is difficult to ensure the output of the battery 3.

Accordingly, it is preferable to use a Li-ion battery, which is superior on the point of output characteristics, and superior on the point of the decline in performance at low temperatures being low and durability, compared to a Ni-MH battery.

The present invention is not limited to the aforementioned embodiment. Although a description was given using a hybrid vehicle that is capable of cylinder deactivation as an example, the present invention may also be applied to a hybrid vehicle that does not perform cylinder deactivation. Also, although a description was given of a hybrid vehicle as a motor-driven vehicle, the present invention may also be applied to an electric vehicle or a fuel cell vehicle. In this case, a fuel cell stack serves as the electricity generating device in a fuel cell vehicle.

Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control device for a motor-driven vehicle, the motor-driven vehicle comprising:
   a motor and an electrical generator serving as power sources of the vehicle; and
   a storage unit that stores electrical energy generated by an output of the electrical generator and regenerative energy that is obtained by regenerative operation of the motor when the vehicle decelerates and has characteristic of the discharge output increasing as a remaining capacity of the storage unit increases, and a charge input decreasing as the remaining capacity increases,
   the control device comprising:
   a zone determining unit that determines at least a normal use zone, a discharge zone in which the remaining capacity is less than the normal use zone, an over-discharge zone in which the remaining capacity is still less than the discharge zone and discharge control is prohibited, a charge zone in which the remaining capacity is greater than the normal use zone, and an over-charge zone in which the remaining capacity is still greater than the charge zone and charge control is prohibited; and
   a control unit controlling the motor by stipulating the charge and discharge power of the storage unit for each zone that is determined by the zone determining unit,
   setting the normal use zone to be in a predetermined range that includes a remaining capacity at which the discharge output according to the remaining capacity of the storage unit and the charge input according to the remaining capacity of the storage unit are equivalent, and
   making the discharge output and the charge input in the normal use zone to be a predetermined value regardless of the remaining capacity of the storage unit in the zone.

2. The control device for a motor-driven vehicle according to claim 1, wherein the control unit charges the remaining capacity value that stops charging in the charge zone to a low charge side when the temperature of the storage unit is higher than a predetermined temperature.

3. The control device for a motor-driven vehicle according to claim 1, wherein the control unit makes the range of the normal use zone narrow when the temperature of the storage unit is lower than a predetermined temperature.

4. The control device for a motor-driven vehicle according to claim 1, wherein the control unit charges the remaining capacity value that stops the discharging in the discharge zone is changed to a high capacity side when the temperature of the storage unit is lower than a predetermined temperature.

5. The control device for a motor-driven vehicle according to claim 1, wherein the storage unit is a lithium-ion battery.

* * * * *